(12) United States Patent
Kanaya

(10) Patent No.: US 6,302,517 B1
(45) Date of Patent: Oct. 16, 2001

(54) PRINTING APPARATUS AND PRINTING METHOD USING MULTIPLE NOZZLE GROUPS

(75) Inventor: Munehide Kanaya, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/453,292

(22) Filed: Dec. 3, 1999

Related U.S. Application Data

(63) Continuation-in-part of application No. 09/337,401, filed on Jun. 22, 1999, which is a continuation of application No. 09/039,252, filed on Mar. 16, 1998, now Pat. No. 5,946,011.

(30) Foreign Application Priority Data

Mar. 18, 1997 (JP) .......................................................... 9-65185
Mar. 25, 1997 (JP) .......................................................... 9-72210

(51) Int. Cl.$^7$ ................................ B41J 2/145; B41J 2/15; B41J 29/38
(52) U.S. Cl. ................................................. 347/41; 347/16
(58) Field of Search .................................. 347/41, 9, 12, 347/14, 16

(56) References Cited

U.S. PATENT DOCUMENTS

| | | | |
|---|---|---|---|
| 4,540,996 | * 9/1985 | Saito | 347/43 |
| 4,920,355 | * 4/1990 | Katerberg | 347/41 |
| 5,889,537 | * 3/1999 | Shimada | 347/41 |
| 5,946,011 | 8/1999 | Kanaya | 347/41 |

* cited by examiner

Primary Examiner—Thinh Nguyen
(74) Attorney, Agent, or Firm—Oblon, Spivak, McClelland, Maier & Neustadt, P.C.

(57) ABSTRACT

A print head 2 has multiple nozzle groups 2a, 2b spaced apart in the sub-scanning direction by a prescribed inter-group distance $pn_i$. Each nozzle group 2a, 2b has multiple nozzles aligned in the sub-scanning direction at a nozzle pitch k. In a first printing scheme in which the nozzle groups record different raster lines, the inter-group distance $pn_i$ is set to a value different from the nozzle pitch k. Since the nozzle pitch k need be secured only within the nozzle groups 2a, 2b individually, a print head 2 with many nozzles can be readily obtained. The sub-scan feed amounts can be set to be a constant value or to be a combination of different values.

39 Claims, 37 Drawing Sheets

Fig. 2(A)   SUB-SCAN FEED CONCEPT  (S = 1)
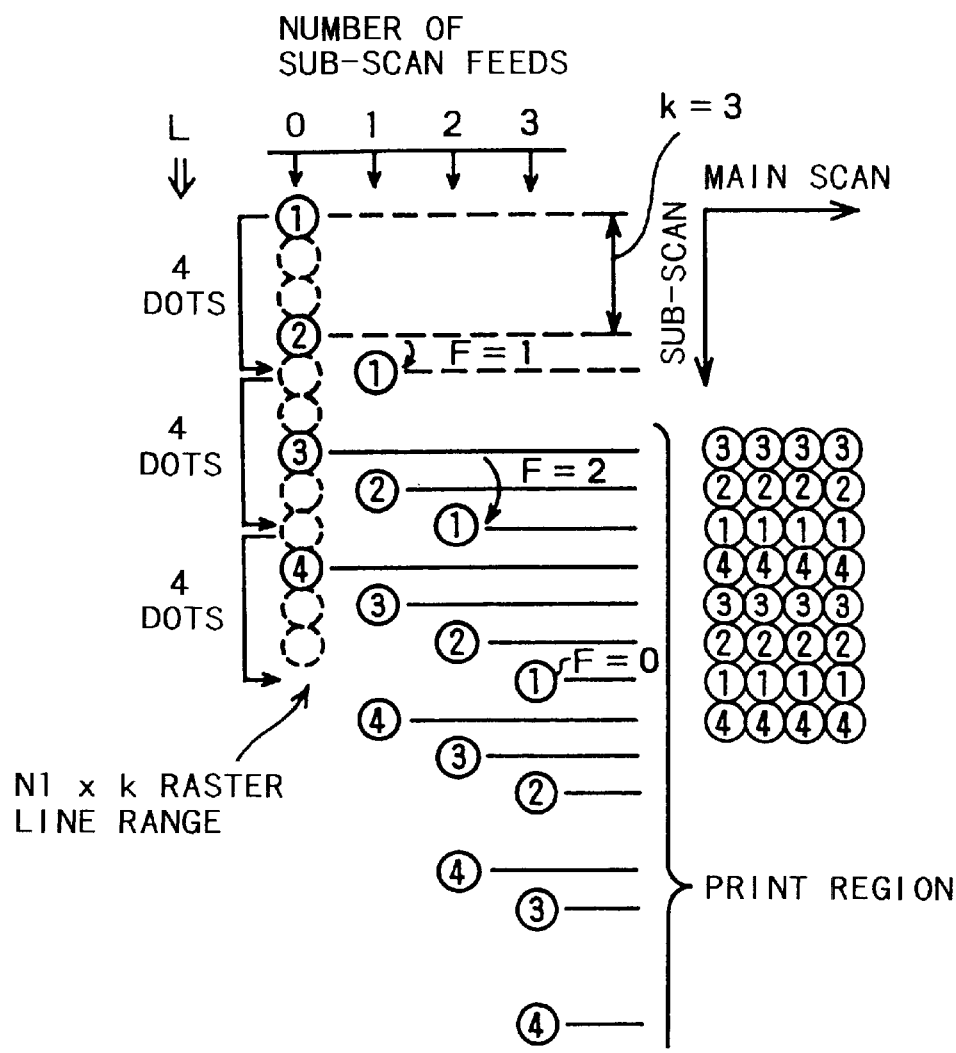
Fig. 2(B)   PARAMETERS
NOZZLE PITCH k          : 3 [dot]
No. OF USED NOZZLES N1  : 4
NUMBER OF SCANS S       : 1
| No. OF SUB-SCAN FEEDS | 0 | 1 | 2 | 3 |
|---|---|---|---|---|
| FEED AMOUNT L [DOT] | 0 | 4 | 4 | 4 |
| ΣL | 0 | 4 | 8 | 12 |
| F=(ΣL)%k | 0 | 1 | 2 | 0 |

Fig. 3(A) SUB-SCAN FEED CONCEPT (S = 2)
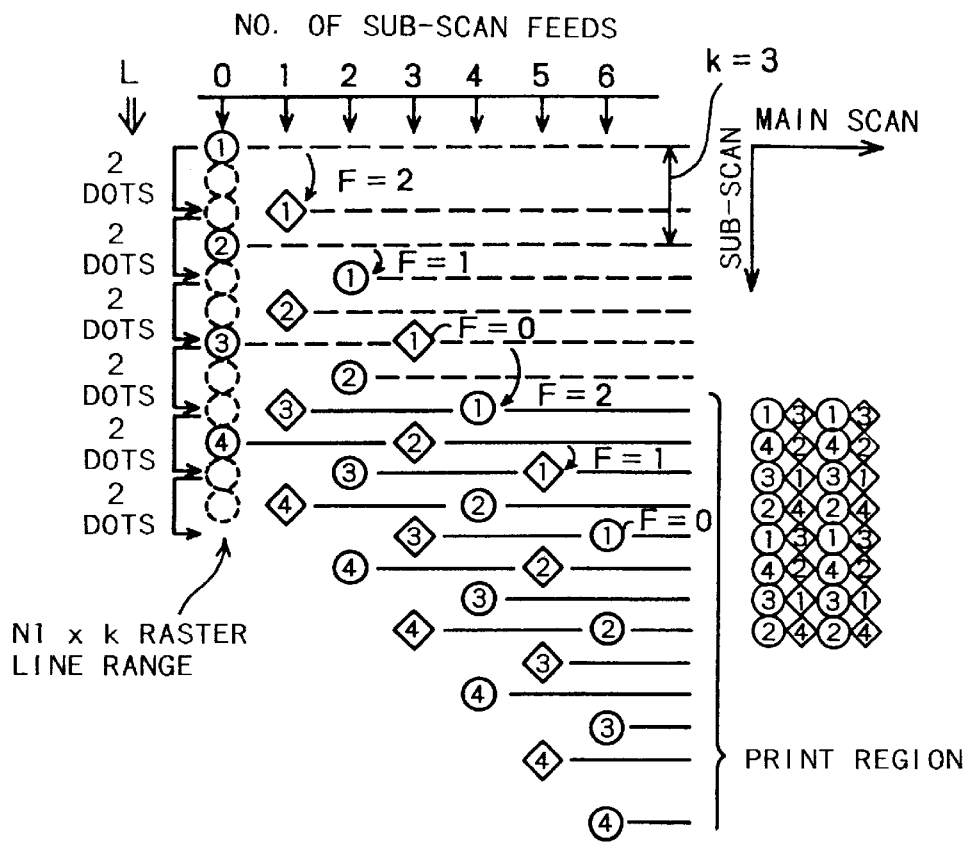
Fig. 3(B) PARAMETERS
NOZZLE PITCH k : 3 [dot]
NO. OF USED NOZZLES N1 : 4
NO. OF SCANS S : 2
| NO. OF SUB-SCAN FEEDS | 0 | 1 | 2 | 3 | 4 | 5 | 6 |
|---|---|---|---|---|---|---|---|
| FEED AMOUNT L [DOT] | 0 | 2 | 2 | 2 | 2 | 2 | 2 |
| $\Sigma L$ | 0 | 2 | 4 | 6 | 8 | 10 | 12 |
| $F=(\Sigma L)\%k$ | 0 | 2 | 1 | 0 | 2 | 1 | 0 |

Fig. 4

FIRST PRINTING SCHEME USING MULTIPLE NOZZLE GROUPS
(EACH NOZZLE GROUP RECORDS DIFFERENT RASTER LINES
FROM THE OTHERS)

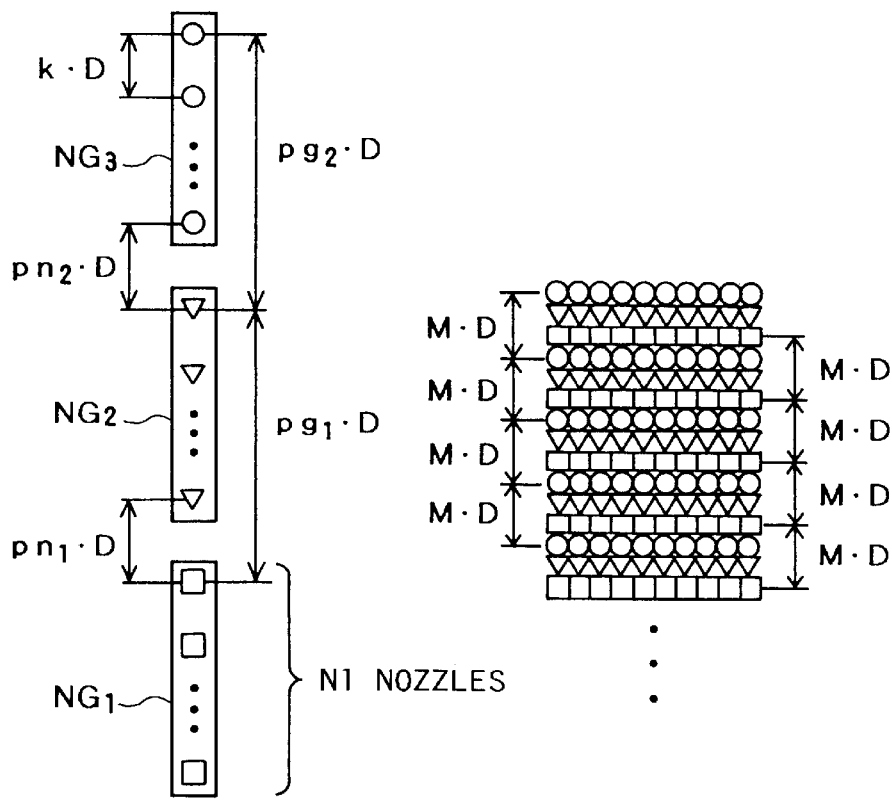

PARAMETER CONDITIONS

NO. OF NOZZLE GROUPS M : Integer not smaller than 2
NO. OF NOZZLES PER GROUP N1 : Integer not smaller than 2
TOTAL NUMBER OF NOZZLES N : N1×M
NOZZLE PITCH k : (k/M) being an integer not smaller than 1
NO. OF SCANS S : Integer not smaller than 1
SUB-SCAN FEED AMOUNT L : M(N1/S) = N/S
$\quad$ N/(M×S) and k/M relatively prime
INTER-GROUP DISTANCE $pn_i$ : Each of (M-1) values of
$\quad$ ($\Sigma pn_i$)%M being a different value
$\quad$ between 1 and (M-1)

Fig. 5

SECOND PRINTING SCHEME USING MULTIPLE NOZZLE GROUPS
(EACH NOZZLE GROUP RECORDS ALL RASTER LINES)

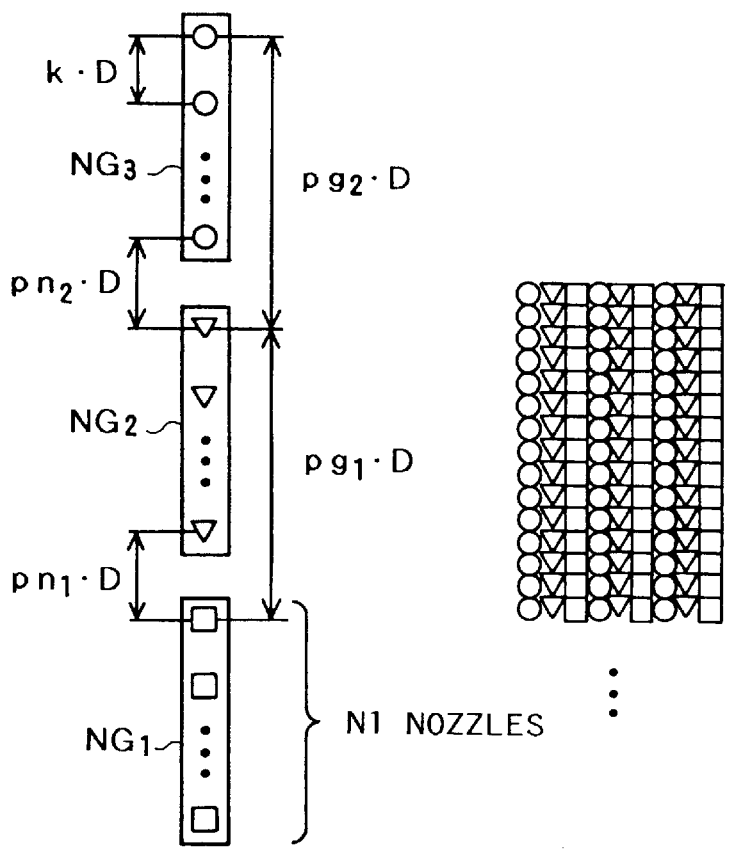

PARAMETER CONDITIONS

NO. OF NOZZLE GROUPS M : Integer not smaller than 2
NO. OF NOZZLES PER GROUP N1 : Integer not smaller than 2
TOTAL NUMBER OF NOZZLES N : N1×M
NOZZLE PITCH k : Integer not smaller than 1
NO. OF SCANS S : Integer not smaller than 1
SUB-SCAN FEED AMOUNT L : $N/(M \times S)$
$\qquad N/(M \times S)$ and k relatively prime
INTER-GROUP DISTANCE $pn_i$ : Integer other than k NO. OF BLOCKS BN = 2
NO. OF NOZZLE GROUPS M = 5
TOTAL NUMBER OF NOZZLES N = 10
NOZZLE PITCH = {k(M − 1) + pb} = 4k +pb

Fig.26

FIRST IRREGULAR-FEED SCHEME USING MULTIPLE NOZZLE GROUPS (EACH NOZZLE GROUP RECORDS DIFFERENT RASTER LINES FROM THE OTHERS)

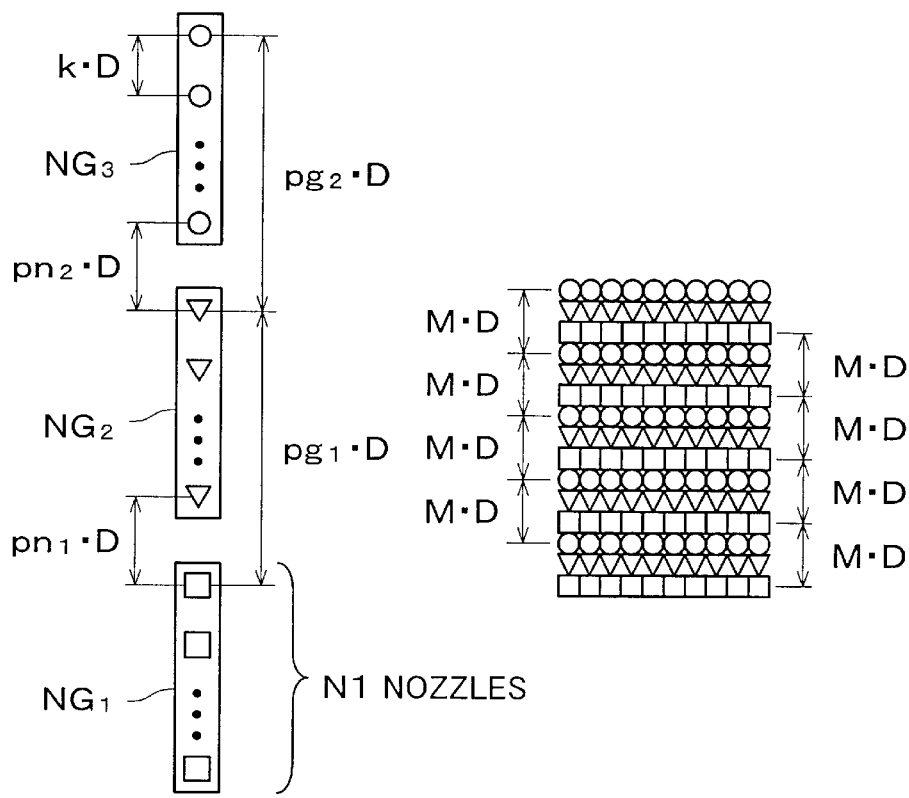

PARAMETER CONDITIONS

No. OF NOZZLE GROUPS M : INTEGER NOT SMALLER THAN 2
No. OF NOZZLES PER GROUP N1 : INTEGER NOT SMALLER THAN 2
TOTAL NUMBER OF NOZZLES N : N = N1*M
NOZZLE PITCH k : (k/M) BEING AN INTEGER NOT SMALLER THAN 1
No. OF SCANS S : NOT SMALLER THAN 1
INTER-GROUP DISTANCE pni : Each of (M − 1) values of $(\Sigma pni)\%M$ takes a different value between 1 and (M − 1)

SUB-SCAN FEED Lj:

(1) Average value ave(Lj/M) of sub-scan feed amount Lj per group during k·S/M scans equal to effective number of nozzles N1/S (2) Value $\{(\Sigma Lj/M)\%(k/M)\}$ at jth sub-scan feed during k·S/M scans (j is an integer between 1 and k·S/M) takes each value between 0 and $\{(k/M) -1\}$, S times.

Fig. 27

FIRST IRREGULAR-FEED SCHEME USING MULTIPLE NOZZLE GROUPS (EACH NOZZLE GROUP RECORDS ALL RASTER LINES)

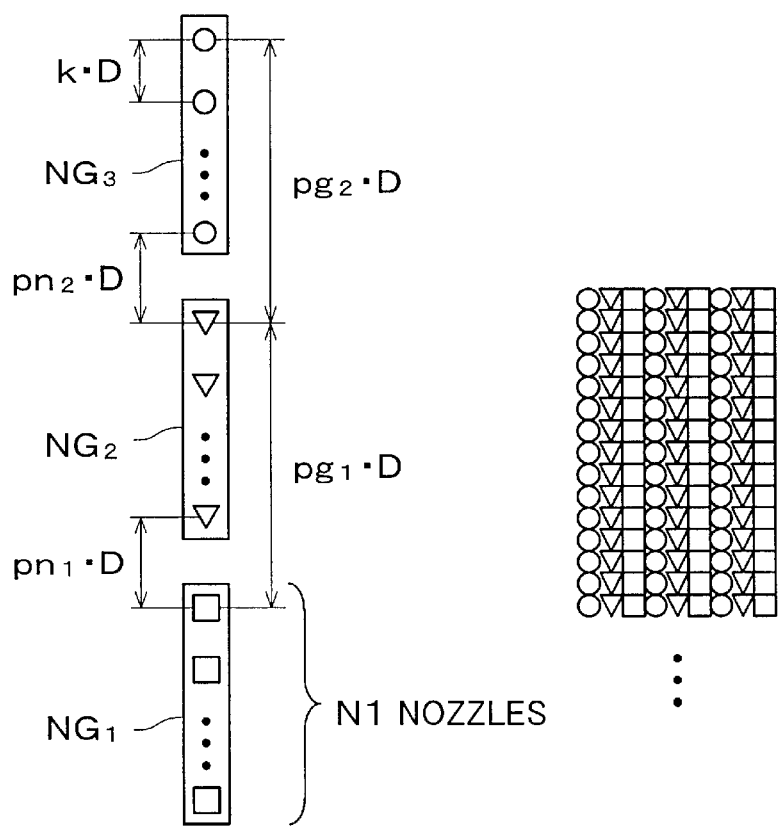

PARAMETER CONDITIONS

No. OF NOZZLE GROUPS M : INTEGER NOT SMALLER THAN 2
No. OF NOZZLES PER GROUP N1 : INTEGER NOT SMALLER THAN 2
TOTAL NUMBER OF NOZZLES N : N = N1*M
NOZZLE PITCH k : (k/M) BEING AN INTEGER NOT SMALLER THAN 1
No. OF SCANS S : NOT SMALLER THAN 1
INTER-GROUP DISTANCE pni : At least one pni is different from k.

SUB-SCAN FEED Lj:

(1) Average value ave(Lj) of sub-scan feed amount Lj during k·S scans equal to effective number of nozzles N1/S (2) Offset ($\Sigma$ Lj)%k at jth sub-scan feed during k·S scans (j is an integer between 1 and k·S) takes each value between 0 and (k − 1), S times.

Fig. 28

PARAMETERS OF FIRST EMBODIMENT OF FIRST IRREGULAR-FEED SCHEME

No. OF NOZZLE GROUPS : M = 2
No. OF NOZZLES PER GROUP : N1 = 6
TOTAL NUMBER OF NOZZLES : N = 12 (=N1*M)
NOZZLE PITCH : k = 4
No. OF SCANS : S = 1
INTER-GROUP DISTANCE : pn = 5

No. OF FEEDS IN ONE CYCLE : k*S/M = 2

VARIATION OF SUB-SCAN FEED L AND OFFSET F

| PASS | 1 | 2 | 3 |
|---|---|---|---|
| No. OF SUB-SCAN | 0 | 1 | 2 |
| FEED AMOUNT L [dot] | 0 | 10 | 14 |
| L/M | 0 | 5 | 7 |
| $\Sigma$(L/M) | 0 | 5 | 12 |
| F=($\Sigma$ L/M)%(k/M) | 0 | 1 | 0 |

AVERAGE FEED PER GROUP : ave(L/M) = 6 (= N1/S)

FIRST EMBODIMENT OF FIRST IRREGULAR-FEED SCHEME

Fig. 30

PARAMETERS OF SECOND EMBODIMENT OF FIRST IRREGULAR-FEED SCHEME

No. OF NOZZLE GROUPS : M = 3
No. OF NOZZLES PER GROUP : N1 = 4
TOTAL NUMBER OF NOZZLES : N = 12 (=N1*M)
NOZZLE PITCH : k = 6
No. OF SCANS : S = 1
INTER-GROUP DISTANCE : pn1 = pn2 = 7
(pn1%M = 1, (pn1 + pn2)%M = 2)
No. OF FEEDS IN ONE CYCLE : k*S/M = 2

VARIATION OF SUB-SCAN FEED L AND OFFSET F

| PASS | 1 | 2 | 3 |
|---|---|---|---|
| No. OF SUB-SCAN | 0 | 1 | 2 |
| FEED AMOUNT L [dot] | 0 | 9 | 15 |
| L/M | 0 | 3 | 5 |
| Σ(L/M) | 0 | 3 | 8 |
| F=(Σ L/M)%(k/M) | 0 | 1 | 0 |

AVERAGE FEED PER GROUP : ave(L/M) = 4 (= N1/S)

Fig. 32

PARAMETERS OF THIRD EMBODIMENT OF FIRST IRREGULAR-FEED SCHEME

No. OF NOZZLE GROUPS : M = 3
No. OF NOZZLES PER GROUP : N1 = 4
TOTAL NUMBER OF NOZZLES : N = 12 (=N1*M)
NOZZLE PITCH : k = 3
No. OF SCANS : S = 1
INTER-GROUP DISTANCE : pn1 = pn2 = 7
  (pn1%M = 1, (pn1 + pn2)%M = 2)
No. OF FEEDS IN ONE CYCLE : k*S/M = 2

VARIATION OF SUB-SCAN FEED L AND OFFSET F

| PASS | 1 | 2 | 3 |
|---|---|---|---|
| No. OF SUB-SCAN | 0 | 1 | 2 |
| FEED AMOUNT L [dot] | 0 | 3 | 9 |
| L/M | 0 | 1 | 3 |
| $\Sigma$(L/M) | 0 | 1 | 4 |
| F=($\Sigma$ L/M)%(k/M) | 0 | 0 | 0 |

AVERAGE FEED PER GROUP : ave(L/M) = 2 (= N1/S)

THIRD EMBODIMENT OF FIRST IRREGULAR-FEED SCHEME

Fig. 34

PARAMETERS OF FIRST EMBODIMENT OF SECOND IRREGULAR-FEED SCHEME

No. OF NOZZLE GROUPS : M = 2
No. OF NOZZLES PER GROUP : N1 = 6
TOTAL NUMBER OF NOZZLES : N = 12 (=N1*M)
NOZZLE PITCH : k = 4
No. OF SCANS : S = 1
INTER-GROUP DISTANCE : pn = 6
No. OF FEEDS IN ONE CYCLE : k*S = 4

VARIATION OF SUB-SCAN FEED L AND OFFSET F

| PASS | 1 | 2 | 3 | 4 | 5 |
|---|---|---|---|---|---|
| No. OF SUB-SCAN | 0 | 1 | 2 | 3 | 4 |
| FEED AMOUNT L [dot] | 0 | 6 | 5 | 6 | 7 |
| $\Sigma L$ | 0 | 6 | 11 | 17 | 24 |
| F=($\Sigma L$)%k | 0 | 2 | 3 | 1 | 0 |

AVERAGE FEED : ave(L) = 6 (= N1/S)

FIRST EMBODIMENT OF SECOND IRREGULAR-FEED SCHEME

Fig. 36

PARAMETERS OF SECOND EMBODIMENT OF SECOND IRREGULAR-FEED SCHEME

No. OF NOZZLE GROUPS : M = 2
No. OF NOZZLES PER GROUP : N1 = 8
TOTAL NUMBER OF NOZZLES : N = 16 (=N1*M)
NOZZLE PITCH : k = 4
No. OF SCANS : S = 2
INTER-GROUP DISTANCE : pn = 6
No. OF FEEDS IN ONE CYCLE : k*S = 8

VARIATION OF SUB-SCAN FEED L AND OFFSET F

| PASS | 1 | 2 | 3 | 4 | 5 | 6 | 7 | 8 | 9 |
|---|---|---|---|---|---|---|---|---|---|
| No. OF SUB-SCAN | 0 | 1 | 2 | 3 | 4 | 5 | 6 | 7 | 8 |
| FEED AMOUNT L [dot] | 0 | 5 | 2 | 3 | 6 | 5 | 2 | 3 | 6 |
| ΣL | 0 | 5 | 7 | 10 | 16 | 21 | 23 | 26 | 32 |
| F=(ΣL)%k | 0 | 1 | 3 | 2 | 0 | 1 | 3 | 2 | 0 |

AVERAGE FEED : ave(L) = 4 (= N1/S)

SECOND EMBODIMENT OF SECOND IRREGULAR-FEED SCHEME

PRINTING APPARATUS AND PRINTING METHOD USING MULTIPLE NOZZLE GROUPS

This application is a C-I-P of Ser. No. 09/337,401 filed Jun. 22, 1999, which is a continuation Ser. No. 09/039,252 filed Mar. 16, 1998, now U.S. Pat. No. 5,946,011.

BACKGROUND OF THE INVENTION

1. Field of the Invention

The present invention relates to a printing apparatus and a printing method using multiple nozzle groups applicable to, for example, an inkjet serial- or line-printer, particularly to a printing apparatus equipped with a print head having multiple dot forming element groups arrayed at different group spacing from the dot forming element pitch and to a printing method therefor.

2. Description of the Related Art

Conventional printing apparatuses include, for example, the serial printer, which prints characters one by one, and the line printer, which prints a line of characters at one time. The serial nonimpact inkjet printer, for instance, provides a printout corresponding to the print data by driving a print head formed with multiple nozzles in the main scanning direction while jetting ink drops from the nozzles and conveying a printing paper or other printing medium in the sub-scanning direction perpendicular to the main scanning direction. Since this conventional inkjet printer forms adjacent dot lines on the printing medium with ink drops jetted from the same nozzles, however, the effect of variance in nozzle characteristics and the like is conspicuous and the print quality low.

This problem is addressed by, for example, U.S. Pat. No. 4,198,642, which teaches interlace printing with constant pitch sub-scanning, i.e., a printing scheme in which the number of used nozzles n and he nozzle pitch k are set to be relatively prime and paper feed is effected at a constant sub-scan amount of n dot pitch. Two integers are relatively prime when they do not have common divisors other than 1.

FIG. 1 is a diagram for explaining conventional interlace printing. The print head 100 has N nozzles #1–#9 arrayed in the sub-scanning direction at a prescribed nozzle pitch k·D (N=9 and k=4 in the illustrated example). Sub-scan feed of a printing paper is conducted at a constant feed amount L·D. In the example shown in FIG. 1, since all of the nozzles are used to jet ink drops, the number of nozzles N and the number of used nozzles n is the same. D denotes the printing resolution and is called the "dot pitch." Regarding the various parameters defined as integer multiples of the dot pitch D (k·D, L·D etc.) in the following description, only their integer portions are sometimes used. For instance, k may be called the "nozzle pitch" and L the "feed amount." When interlace printing is conducted, the nozzle pitch k and the sub-scan feed amount L (=n) are relatively prime. For example, if k=4 and the printing resolution in the sub-scanning direction is 360 dpi, the nozzle pitch k is 4 dots (4/360 inch). Similarly, the paper feed amount, i.e., the sub-scan feed amount L (=n) is 9 dots (9/360 inch).

As shown in FIG. 1, effecting a sub-scan of L dot pitch once every main scan of the print head 100 causes adjacent dot lines to be printed by different nozzles. For instance, the dot line formed by the first main scan pass of nozzle #7 is followed by a dot line formed by nozzle #5, which is followed by a dot line formed by nozzle #3, which is followed by a dot line formed by nozzle #1. Interlace printing can therefore produce high-quality printed images since it spreads out the effect of nozzle characteristic variance.

In the conventional inkjet printer of the interlace printing type, it is taken for granted that a constant nozzle pitch k can be secured. Based on this assumption, the nozzle pitch k and the number of driven nozzles n are set to be relatively prime and paper feed is conducted at a constant pitch of n dots.

Demand for higher printing speeds in recent years has heightened the need to form print heads with larger numbers of nozzles. Consistent formation of many nozzles at a constant nozzle pitch is, however, difficult. Nozzle pitch is apt to change midway and defects are likely to occur in some of the nozzles. When the prescribed nozzle pitch cannot be obtained, the quality of interlace printing by the prior art is markedly degraded owing to overwriting and/or skipping of raster lines. Since the prescribed nozzle pitch has to be secured in print heads, increase of the nozzle number will lower the production yield and raise the production cost proportionally. The prior art thus does not take into account the recent need for the larger number of nozzles. Since the prior art printing technique requires a constant nozzle pitch for all the nozzles of the nozzle head, it cannot be applied without modification to a printing apparatus having a large number of nozzles for which a constant nozzle pitch is difficult to obtain.

SUMMARY OF THE INVENTION

Accordingly, an object of the present invention is to reproduce a high-quality printed image using a print head with a large number of dot forming elements. Another object of the present invention is to enable interlace printing even when the pitch of the dot forming elements changes midway.

In order to attain the above and other objects of the present invention, there is provided a printing apparatus that effects printing by forming dots in a print region on a printing medium. The printing apparatus comprises: a print head; a first scan driver which moves at least one of the print head and the printing medium in a first scanning direction; a second scan driver which moves at least one of the print head and the printing medium in a second scanning direction perpendicular to the first scanning direction; and a print head driver which drives the print head to form dots on the printing medium responsive to print image data. The print head includes N number (N being an integer not smaller than 4) of dot forming elements, where a minimum element pitch in the second scanning direction between a neighboring pair of the dot forming elements is k·D (k being an integer; D being a dot pitch corresponding to printing resolution) in the print head. The N number of dot forming elements is classified into M number of dot forming element groups each including N/M number of dot forming elements (M and N/M being integers not smaller than 2), and an ith (i being an integer between 1 and (M−1)) dot forming element group and an (i+1)th dot forming element group among the M number of dot forming element groups are offset in the second scanning direction by an inter-group pitch $pg_i \cdot D$ ($pg_i$ being an integer different from k). The first and second scan drivers and the print head driver drive the print head and the printing medium so that the M number of dot forming element groups have identical patterns of dot-formable positions and the identical patterns of the M number of dot forming element groups are shifted from each other to make all dot positions in the print region to be dot-formable.

The term "dot forming element" here denotes a mechanism which forms dots on the printing medium, including for example an inkjet type actuator using a piezoelectric vibrator or heater to jet ink drops from apertures.

Since this printing apparatus can effect interlace printing at a feed amount of 2·D or greater using M number of dot forming element groups, it can produce high-quality printed images using a print head equipped with a large number of dot forming elements.

The second scan driver may convey at least one of the print head and the printing medium in the second scanning direction using a combination of different feed amounts. Alternatively, The second scan driver may convey at least one of the print head and the printing medium in the second scanning direction at a constant feed amount that is at least twice the dot pitch D.

According to an aspect of the present invention, each neighboring pair of the dot forming element groups are spaced apart by an interval in the second scanning direction, and the N/M number of dot forming elements of each dot forming element group are capable of forming NIM number of identical dots aligned substantially in a single row in the second scanning direction at the minimum element pitch k·D.

In a preferred embodiment, the identical patterns of the M number of dot forming element groups are composed of multiple first scanning direction dot lines occurring periodically at a pitch of M dots.

The ith and (i+1)th dot forming element groups are separated by an inter-group distance $pn_i \cdot D$ ($pn_i$ being an integer) and $pn_i$ is set so that each of (M−1) number of remainders of dividing an accumulated value ($\Sigma pn_i$) of the values $pn_1$ to $pn_i$ by M takes a different value between 1 and (M−1).

When, in this way, N number of dot forming elements are grouped into M number of dot forming element groups and the inter-group distance $pn_i \cdot D$ of the dot forming element groups is set in the foregoing manner, it suffices to establish a prescribed minimum element pitch k·D within the individual dot forming element groups. In other words, a print head having a large number of dot forming elements can be readily obtained by integrating dot forming element groups having dot forming elements aligned at a prescribed minimum element pitch k·D.

The print head may be formed by arraying M number of dot forming element units separated in the second scanning direction by the inter-group distance $pn_i \cdot D$, each dot forming element unit having the N/M number of dot forming elements whose pitch in the second scanning direction is equal to the minimum element pitch k·D.

By using multiple dot forming element units having dot forming elements with an element pitch k·D, a print head having a larger number of dot forming elements than heretofore can be readily obtained. Specifically, higher yield and lower production cost can be achieved when the print head is formed by arraying multiple dot forming element units than when it is formed by incorporating a large number of dot forming elements into the print head at one time.

Each dot forming element unit may have a row of even-numbered dot forming elements and a row of odd-numbered dot forming elements each having multiple dot forming elements aligned in the second scanning direction at an element pitch 2k·D which is twice the minimum element pitch k·D, where the row of even-numbered dot forming elements and the row of odd-numbered dot forming elements are spaced from each other in the first scanning direction.

By arranging two rows of dot forming elements side by side in the first scanning direction, the element pitch of each row of dot forming elements can be made twice (=2k·D) that in the case of forming only a single row. A large number of dot forming elements can therefore be easily formed in a single dot forming element unit.

The first scan driver may drive the at least one of the print head and the printing medium in the first scanning direction at a first scanning direction speed that is a function of the number of scans S.

When the number of scans S is set at 2 (S=2), for instance, every continuous dot line in the first scanning direction is formed by 2 scans. The printing speed is therefore halved if the print head feed speed (the first scanning direction speed) is the same as when S=1. The print head feed speed is therefore dynamically varied as a function of the number of scans S to enable production of a high-quality printed image without lowering the printing throughput. More specifically, "first scanning direction speed that is a function of the number of scans S" means a first scanning direction speed proportional to the number of scans S. Although the first scanning direction speed is preferably in proportion to the number of scans S is doubled, the invention is not limited to this.

According to another aspect of the present invention, the identical patterns of the M number of dot forming element groups are composed of multiple dots occurring periodically at a pitch of M dots on every first scanning direction dot line.

The ith and (i+1)th dot forming element groups may be separated by an inter-group distance $pn_i \cdot D$ where $pn_i$ is an integer and at least one of $pn_i$ is different from k.

When N number of dot forming elements are grouped into M number of dot forming element groups and the inter-group distance $pn_i \cdot D$ of the dot forming element groups is set in the foregoing manner, it suffices to establish a prescribed minimum element pitch k·D within the individual dot forming element groups. In other words, a print head having a large number of dot forming elements can be readily obtained by integrating dot forming element groups having dot forming elements aligned at a prescribed minimum element pitch k·D.

The M number of dot forming element groups may be formed by inactivating at least one dot forming element in the print head among the multiple dot forming elements arrayed in the second scanning direction at the minimum element pitch k·D.

In other words, multiple dot forming element groups may be obtained by not using at least one of a plurality of dot forming elements all of which are arrayed at a prescribed minimum element pitch k·D in the second scanning direction. In this case, the inter-group distance $pn_i \cdot D$ is a multiple of the minimum element pitch k·D. With this arrangement, interlace printing according to the invention can be effected when, for example, some dot forming elements are out of service, of degraded quality or otherwise defective by inactivating the defective dot forming element(s).

According to still another aspect of the present invention, the N number of dot forming elements are separated into BN number of blocks (BN being equal to N/M) each including M number of dot forming elements, a neighboring pair of the BN number of blocks being separated by an inter-block distance pb·D (pb being a positive integer unequal to k), the M number of dot forming element groups being composed of corresponding dot forming elements in the blocks. The M number of dot forming elements of each block are capable of forming M number of identical dots aligned substantially in a single row in the second scanning direction at the minimum element pitch k·D.

Consider, for example, the case where 10 dot forming elements are divided into two blocks (N=10, BN=2). Since each block is formed with 5 dot forming elements (N/BN= 10/2=5), each block has first to fifth dot forming elements.

By grouping the corresponding dot forming elements of the blocks, e.g., by grouping the first dot forming elements with each other, the second dot forming elements with each other and the third dot forming elements with each other, it is possible to configure five dot forming element groups. When dot forming element groups are configured in this manner, overlap printing can be effected by the interlace method.

The BN number of blocks may formed by inactivating at least one dot forming element in the print head among the multiple dot forming elements arrayed in the second scanning direction at the minimum element pitch k·D The first scan driver may drive the at least one of the print head and the printing medium in the first scanning direction at a first scanning direction speed that is a function of the number of scans M·S.

Here the M number of dot forming element groups each scans the same dot line S times. When two dot forming element groups M1 and M2 are used, for example, each dot line in the print region is scanned by the first dot forming element group M1 and is also scanned by the second dot forming element group M2. The two scans by the dot forming element groups M1, M2 complete forming a continuous dot line in the first scanning direction. Since S designates the number of scans of each dot forming element group it can be called the "number of group scans S."

When S is set at 2 (S=2), for instance, each continuous dot line in the first scanning direction is formed by 2M scans. The printing speed is therefore halved if the print head feed speed (the first scanning direction speed) is the same as when S=1. The print head feed speed is therefore adaptively varied as a function of the number of scans M·S to enable production of a high-quality printed image without lowering the printing throughput.

More specifically, "first scanning direction speed that is a function of the number of scans M·S" means that the first scanning direction speed increases with the number of scans M·S. Although the first scanning direction speed is preferably in proportion to the number of scans M·S, the invention is not limited to this.

The present invention is also directed to a printing method that effects printing by forming dots in the print region on the printing medium. The method comprises the steps of providing a print head including N number (N being an integer not smaller than 4) of dot forming elements, a minimum element pitch in the second scanning direction between a neighboring pair of the dot forming elements being k·D (k being an integer; D being a dot pitch corresponding to printing resolution) in the print head, the N number of dot forming elements being classified into M number of dot forming element groups each including N/M number of dot forming elements (M and N/M being integers not smaller than 2), an ith (i being an integer between 1 and (M−1)) dot forming element group and an (i+1)th dot forming element group among the M number of dot forming element groups being offset in the second scanning direction by an inter-group pitch $pg_i \cdot D$ ($pg_i$ being an integer different from k); and driving the print head and the printing medium so that the M number of dot forming element groups have identical patterns of dot-formable positions and the identical patterns of the M number of dot forming element groups are shifted from each other to make all dot positions in the print region to be dot-formable.

The present invention is also directed to a computer program product comprising: a computer readable medium; and a computer program stored on the computer readable medium. The computer program comprises a program for causing the computer to produce print data for driving the print head and the printing medium so that the M number of dot forming element groups have identical patterns of dot-formable positions and the identical patterns of the M number of dot forming element groups are shifted from each other to make all dot positions in the print region to be dot-formable.

These and other objects, features, aspects, and advantages of the present invention will become more apparent from the following detailed description of the preferred embodiments with the accompanying drawings.

BRIEF DESCRIPTION OF THE DRAWINGS

FIGS. 2(A) and 2(B) are explanatory diagrams for demonstrating the basic conditions of a printing scheme using one nozzle group.

FIGS. 3(A) and 3(B) are explanatory diagrams for demonstrating the basic conditions of a printing scheme when the number of scans S is 2 or greater.

FIG. 4 is an explanatory diagram for demonstrating the basic conditions of a first printing scheme using multiple nozzle groups.

FIG. 5 is an explanatory diagram for demonstrating the basic conditions of a second printing scheme using multiple nozzle groups.

FIG. 26 is a diagram for explaining the basic conditions of a first irregular-feed printing scheme using multiple nozzle groups.

FIG. 27 is a diagram for explaining the basic conditions of a second printing scheme conducting irregular feed using multiple nozzle groups.

FIG. 28 is diagram for explaining the parameters of a first embodiment of the fist irregular-feed printing scheme.

FIG. 30 is diagram for explaining the parameters of a second embodiment of the first irregular-feed printing scheme.

FIG. 32 is diagram for explaining the parameters of a third embodiment of the first irregular-feed printing scheme.

FIG. 34 is diagram for explaining the parameters of a first embodiment of the second irregular-feed printing scheme.

FIG. 36 is diagram for explaining the parameters of a second embodiment of the second irregular-feed printing scheme.

DESCRIPTION OF THE PREFERRED EMBODIMENTS

Figure 1:
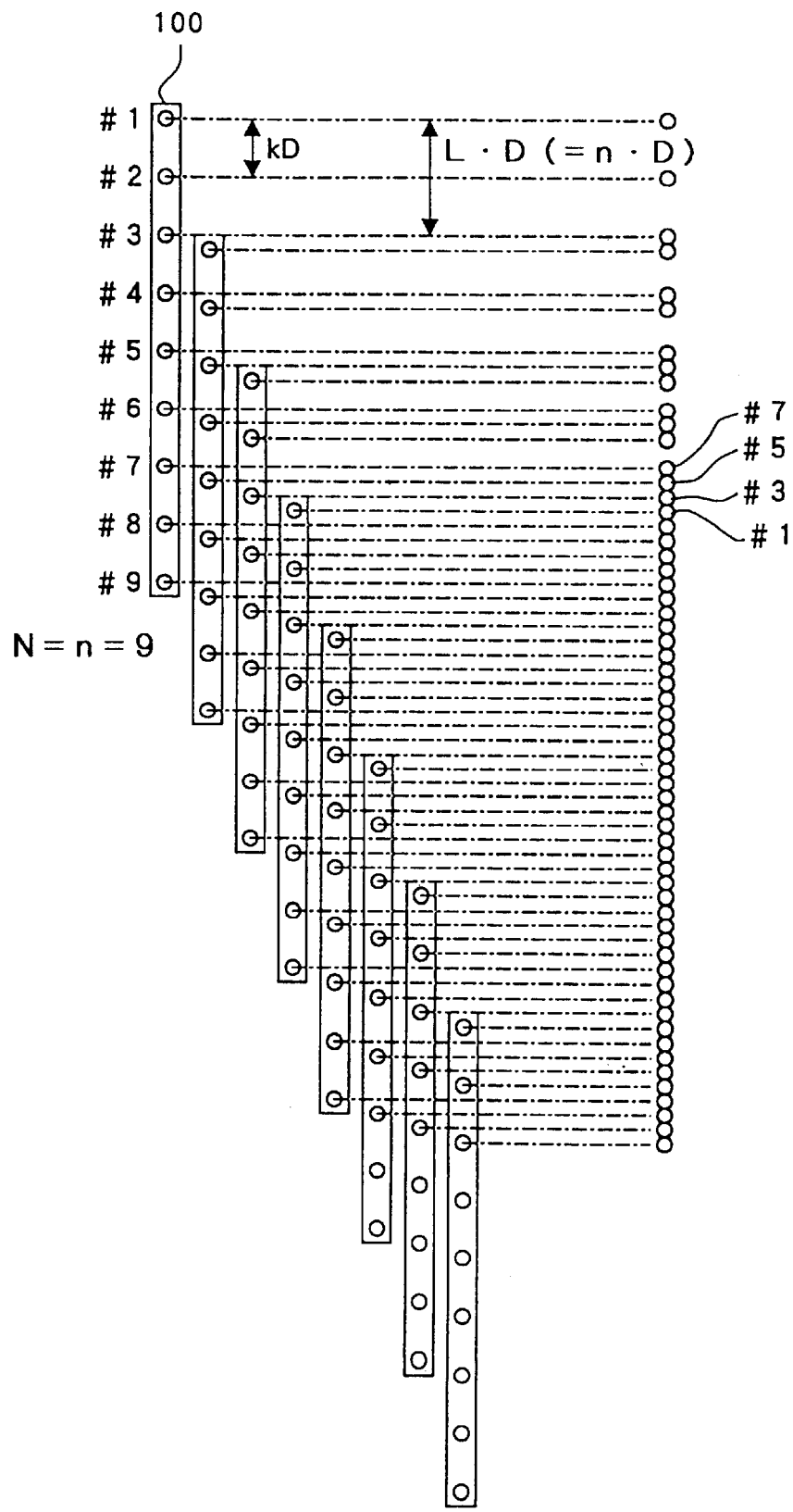
FIG. 1 is an explanatory diagram showing interlace printing by the prior art.

A. Basic Conditions of Ordinary Printing Scheme

A-1. Basic Conditions of Printing Scheme Using one Nozzle Group.

FIGS. 2(A) and 2(B) are explanatory diagrams for demonstrating the basic conditions of a printing scheme using one nozzle group. The solid line circles including numerals in FIG. 2(A) indicate the positions of 4 nozzles in the sub-scanning direction after each sub-scan feed. The encircled numerals 1–4 signify the nozzle numbers.

Various parameters related to the printing scheme are shown in FIG. 2(B). The parameters of the printing scheme include the nozzle pitch k [dot], number of used nozzles N1, number of scans S, and sub-scan feed amount L [dot]. The number of scans S indicates the number of sub-scans in which all dots of a given raster line are serviced. In the example of FIG. 2, since the dots of every raster line are serviced by one sub-scan, S=1.

In the example of FIGS. 2(A) and 2(B), the nozzle pitch k is 3 dots and the number of used nozzles N1 is 4. (The number of used nozzles N1 is the number of nozzles actually used among the multiple nozzles provided.) The number of scans S indicates that dots are formed intermittently once every S dots on a raster line during a single main scan. The number of scans S is therefore equal to the number of nozzles used to record all dots of each raster line.

The table in FIG. 2(B) shows, for each sub-scan feed, the sub-scan feed amount L, the accumulated value $\Sigma L$ thereof, and the nozzle offset F after sub-scan feed. The offset F is a value indicating the distance in number of dots between the nozzle position and reference positions of offset 0. The reference positions are presumed to be those periodic positions having a pitch k, which include the initial positions of the nozzles where no sub-scan feed has been conducted (every third dot in FIG. 2(A)). For example, as shown in FIG. 2(A), the first sub-scan feed moves the nozzles in the sub-scanning direction by the sub-scan feed amount L (4 dots). Since the nozzle pitch k is 3 dots, the offset F of the nozzles after the first sub-scan feed is 1 (see FIG. 2(A)). Similarly, the position of the nozzles after the second sub-scan feed is $\Sigma L$ (=8) dots away from the initial position so that the offset F is 2. The position of the nozzles after the third sub-scan feed is $\Sigma L$ (=12) dots away from the initial position so that the offset F is 0. Since the third sub-scan feed brings the nozzle offset F back to 0, all dots of the raster lines within the print region can be serviced by repeating the cycle of 3 sub-scans.

As will be understood from the foregoing example, when the nozzle position is a position that is an integer multiple of the nozzle pitch k away from the initial position, the offset F is 0. Further, the offset F is given by $(\Sigma L) \% k$, where $\Sigma L$ is the accumulated value of the sub-scan feed amount L , k is the nozzle pitch, and "%" is an operator indicating that the remainder of the division is taken. (Viewing the initial position of the nozzles as being periodic, the offset F can also be viewed as the amount of phase shift of the nozzles from the initial position.)

When the number of scans S is 1 and the sub-scan feed amount L is constant, the following condition C1 must be satisfied to avoid skipping and/or overwriting of raster lines to be recorded.

[Condition C1]:

Sub-scan feed amount L equal to number of used nozzles N1, and sub-scan feed amount L (=N1) and nozzle pitch k relatively prime.

Condition C1 can be understood as follows. When recording is effected with no skipping of raster lines, N1×k raster lines are recorded during k sub-scans. After the k number of sub-scan feeds, the nozzle position ought to be N1×k raster lines away from the initial nozzle position. This nozzle position can be attained by making "the sub-scan feed amount L equal to the number of used nozzles N1." To avoid skipping and/or overwriting of the raster lines to be recorded, it is necessary for the offsets F during the k number of sub-scan feeds to assume mutually different values between 0 and (k−1). Such values of the offsets F can be ensured by making "the sub-scan feed amount L (=N1) and nozzle pitch k relatively prime." Two integers are said to be "relatively prime" if they have no common divisors other than 1. Skipping and overwriting of raster lines to be recorded can be avoided by satisfying condition C1.

FIGS. 3(A) and 3(B) are explanatory diagrams for demonstrating the basic conditions of a printing scheme when the number of scans S is 2 or greater. The printing scheme shown in FIGS. 3(A) and 3(B) amounts to that obtained by changing the number of scans S and the sub-scan feed amount L among the printing scheme parameters shown in FIG. 2(B). As will be understood from FIG. 3(A), the sub-scan feed amount L in the printing scheme of FIGS. 3(A) and 3(B) is a constant value of 2 dots. In FIG. 3(A) the positions of the nozzles after odd-numbered sub-scan feeds are indicated by diamonds. As shown on the right-hand side of FIG. 3(A), the dot positions recorded after odd-numbered sub-scan feeds are shifted by one dot in the main scanning direction from the dot positions recorded after even-numbered sub-scan feeds. This means that the plurality of dots in any given raster line are recorded intermittently by each of 2 different nozzles. For example, the uppermost raster line within the print region is intermittently recorded every other dot by nozzle #3 after the first sub-scan feed and is thereafter intermittently recorded every other dot by nozzle #1 after the fourth sub-scan feed. Thus, when the number of scans S is 2 or greater, each raster line is recorded by S number of different nozzles.

The bottom line in the table of FIG. 3(B) shows the value of the offset F after each of multiple sub-scans. The values of offsets F after the first to sixth sub-scan feeds include each value between 0 and 2 twice.

Since one raster line is ordinarily recorded by S number of scans hen the number of scans S is 2 or greater, the effective number of nozzles can be considered to be N1/S. The sub-scan feed amount L can therefore be set equal to the effective number of nozzles N1/S. Specifically, when the number of scans S is an integral value of 2 or greater, condition C1 set out above can be rewritten as the following condition C1'.

[Condition C1']:

Sub-scan feed amount L equal to effective number of nozzles N1/S, and sub-scan feed amount L (=N1/S) and nozzle pitch k relatively prime.

Since the sub-scan feed amount L and the nozzle pitch k are also relatively prime in condition C1', the offsets F after the k number of sub-scan feeds assume mutually different values between 0 and (k-1), as shown in FIG. 3(B). Moreover, the offsets F after k×S number of sub-scan feeds assume each value between 0 and (k-1), S number of times. (The number of scans S is selected so that N1/S is an integer not smaller than 1.)

Condition C1' also holds when the number of scans S is 1. Condition C1' therefore holds generally with respect to a printing scheme that effects sub-scan feed at a constant feed amount L using one nozzle group, irrespective of the value of the number of scans S. In a case where the number of scans S is 2 or greater, however, the condition of mutual offset among the recording positions of the nozzles recording a given raster line must be satisfied.

A-2. Basic Conditions of Printing Scheme Using Multiple Nozzle Groups

FIG. 4 is an explanatory diagram for demonstrating the basic conditions of a first printing scheme using multiple nozzle groups. M number of nozzle groups $NG_1$–$NG_M$ (M=3 in FIG. 4) have identically arrayed nozzles, and each group has N1 number of nozzles disposed at a constant nozzle pitch k. The total number of nozzles N of the M number of nozzle groups $NG_1$–$NG_M$ is therefore equal to N1·M. The distance between the ith nozzle group $NG_i$ and the (i+1)th nozzle group $NG_{i+1}$ (called the "inter-group distance") is $pn_i$ dots. The distance between corresponding nozzles of the ith nozzle group $NG_1$ and the (i+1)th nozzle group $NG_{i+1}$ (called the "inter-group pitch") is $pg_i$ dots.

The raster lines recorded by the individual nozzle groups are distinguished on the right-hand side of FIG. 4. As this shows, in the first printing scheme each nozzle group records different raster lines from the others and the raster lines recorded by any given nozzle group occur periodically at a pitch of M dots. (How these raster lines are recorded will be described later in detail.) Specifically, in the first printing scheme all of the raster line groups recorded by the individual nozzle groups exhibit the same periodic pattern of arrangement at a pitch of M dots. All dots in the print region are recorded by offsetting this identical pattern little by little every nozzle group.

In the printing scheme of FIG. 4, since each nozzle group uses multiple nozzles arrayed at nozzle pitch k to record raster lines spaced at a pitch of M dots, the sub-scan feed amount L is set to M times that of the feed amount N1/S for a single nozzle group, that is, M·N1/S=N/S. Moreover, since this printing scheme is thought to be equivalent to a scheme in which each nozzle group uses nozzles with a nozzle pitch of (k/M) to record raster lines at a pitch of one dot, the effective number of nozzles N1/S is set to be prime relative to k/M. Condition C1' can then be rewritten as follows.

[Condition C2a]:

Sub-scan feed amount L equal to M times effective number of nozzles N1/S (=N/S), and effective number of nozzles N1/S (=N/(M·S)) and (k/M) relatively prime.

When condition C2a is satisfied, each nozzle group can record raster lines spaced at a pitch of M dots. (The nozzle pitch k and the number of nozzle groups M are selected to make (k/M an integer not smaller than 1.) On the other hand, the raster line groups recorded by the nozzle groups can be mutually offset little by little as shown on the right-hand side of FIG. 4 by satisfying the following condition C2b.

[Condition C2b]:

Each of (M-1) values of $(\Sigma pn_i)\%$ M takes a different value between 1 and (M$_{-1}$). where $(\Sigma pn_i)$ is the accumulated value of the inter-group distances $pn_1$–$pn_i$ from the first to the ith nozzle group (i being an integer between 1 and (M-1)), and the operator "%" indicates an operation of taking the remainder of division. As far as the inter-group distance $pn_i$ satisfies condition C2b, the values of the (M-1) number of inter-group distances $pn_1$ –$pn_i$ can be equal to each other.

The following condition C2c, using the inter-group pitch $pg_i$ instead of the inter-group distance $pn_i$ in condition C2b, also holds.

[Condition C2c]:

Each of (M-1) values of $(\Sigma pg_i)\%$ M takes a different value between 1 and (M-1).

Condition C2c is more general than condition C2b because the inter-group pitch $pg_i$ can be made smaller than the distance k·(N1-1) between the opposite ends of one nozzle group. That is, condition C2b is a special case satisfying the more general condition C2c.

FIG. 5 is an explanatory diagram for demonstrating the basic conditions of a second printing scheme using multiple nozzle groups. In this printing scheme, each nozzle group records 1/M of all dots of every raster line. In other words, the dots recorded by each nozzle group occur at a pitch of M dots in every raster line. (How these dots are recorded will be described later in detail.) In this printing scheme, since each nozzle group records at every raster line, the same condition holds regarding the sub-scan feed as in the printing scheme shown in FIGS. 3(A) and 3(B) using only one nozzle group.

[Condition C3a]:

Sub-scan feed amount L equal to effective number of nozzles N1/S (=N/(M·S)), and sub-scan feed amount L (=N/(M·S)) and nozzle pitch k relatively prime.

Regarding the inter-group distance $pn_i$, it suffices to satisfy the following condition C3b, which is less strict than condition C2b.

[Condition C3b]:

Inter-group distance $pn_i$ a different value from nozzle pitch k.

Similarly, regarding the inter-group pitch $pg_i$, it suffices to satisfy the following condition C3c, which is less strict than condition C2c.

[Condition C3c]:

Inter-group distance $pg_i$ a different value from nozzle pitch k.

In the printing scheme shown in FIG. 5, each raster line is recorded by M number of nozzle groups and each nozzle group effects recording of one raster line in S number of scans. Since every raster line is recorded in M·S number of scans, (M·S) is called the "number of raster line scans." The number of scans S of one nozzle group is called the "number of group scans."

Although in the example of FIG. 5 each dot line in the column direction (vertical direction) is recorded by one nozzle group, it is instead possible, as in the example of FIGS. 17 and 18 explained later, to record each dot line in the column direction with different nozzle groups. The dots recorded by each nozzle group occur at a pitch of M dots in every raster line in this case, too, but the positions of the dots recorded by the nozzle group are progressively offset in the row direction every raster line. Specifically, in the second printing scheme the dots recorded by each nozzle group exhibit the same pattern of periodic arrangement at a pitch of M dots in each raster line and all dots in the print region are recorded by offsetting this identical pattern little by little every nozzle group.

The term "dot line" is used in this specification to indicate either a series of dots in the row (horizontal) direction (i.e. a raster line) or a series of dots in the column (vertical) direction.

In the first printing scheme explained earlier, each nozzle group records raster lines at a pitch of M dots and records all dots in these raster lines. In the second printing scheme, each nozzle records at every raster line but records dots at a pitch of M dots in each raster line. The first and second printing schemes are common in the point that "the recording positions of multiple nozzle groups form identical recording position patterns and the recording position patterns of the multiple nozzle groups are offset from each other to service all dot positions in the print region." In the first printing scheme the "identical recording patterns" are patterns composed of "raster lines spaced at a pitch of M dots" and in the second printing scheme are patterns composed of "dots spaced at a pitch of M dots at every raster line."

B. Embodiments of First Constant-feed Printing Scheme

B-1. First Embodiment of First Printing Scheme

Figure 6:
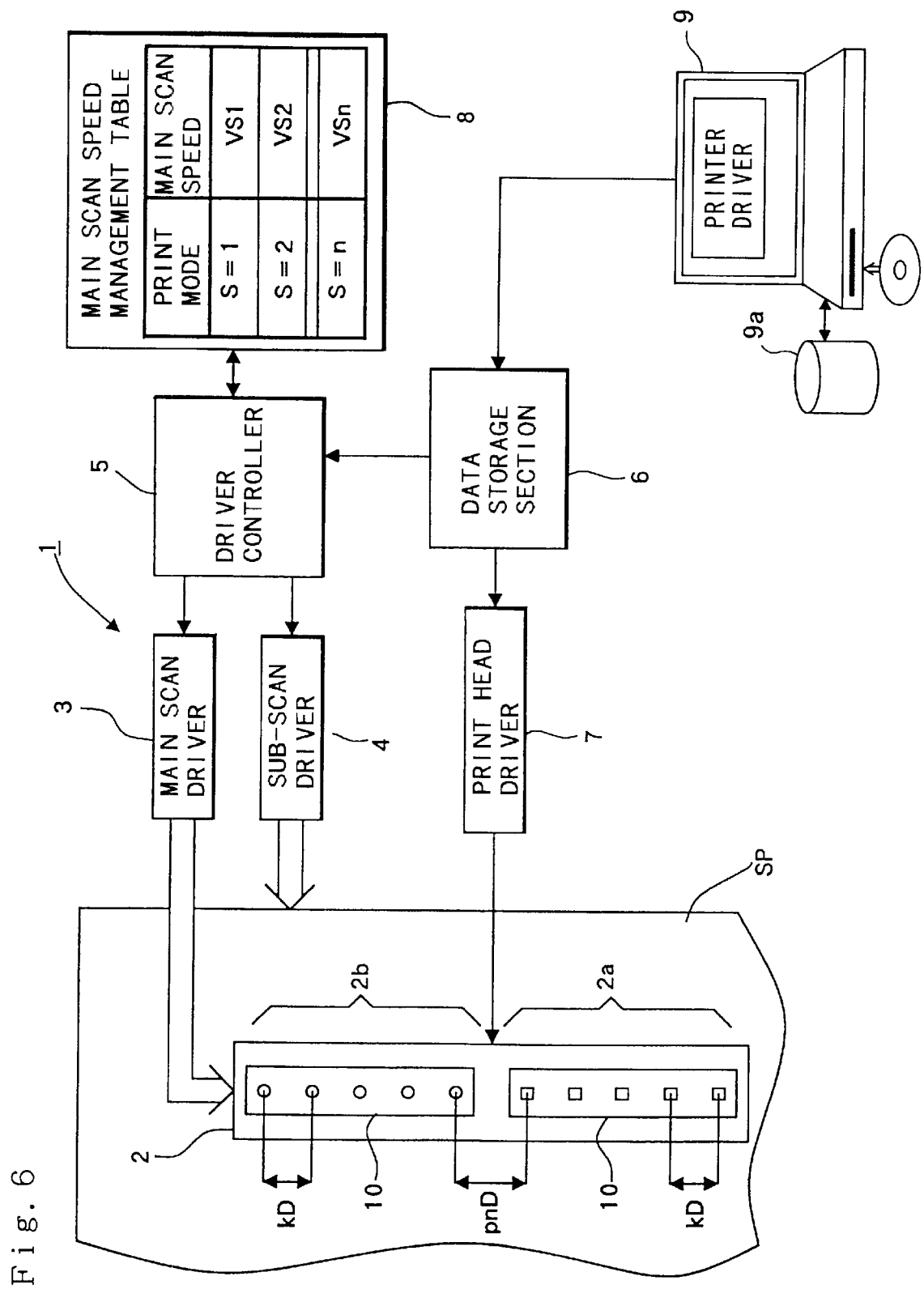
FIG. 6 is a schematic view showing the overall configuration of a printing apparatus according to a first embodiment of the first printing scheme of the invention.
Figure 7:
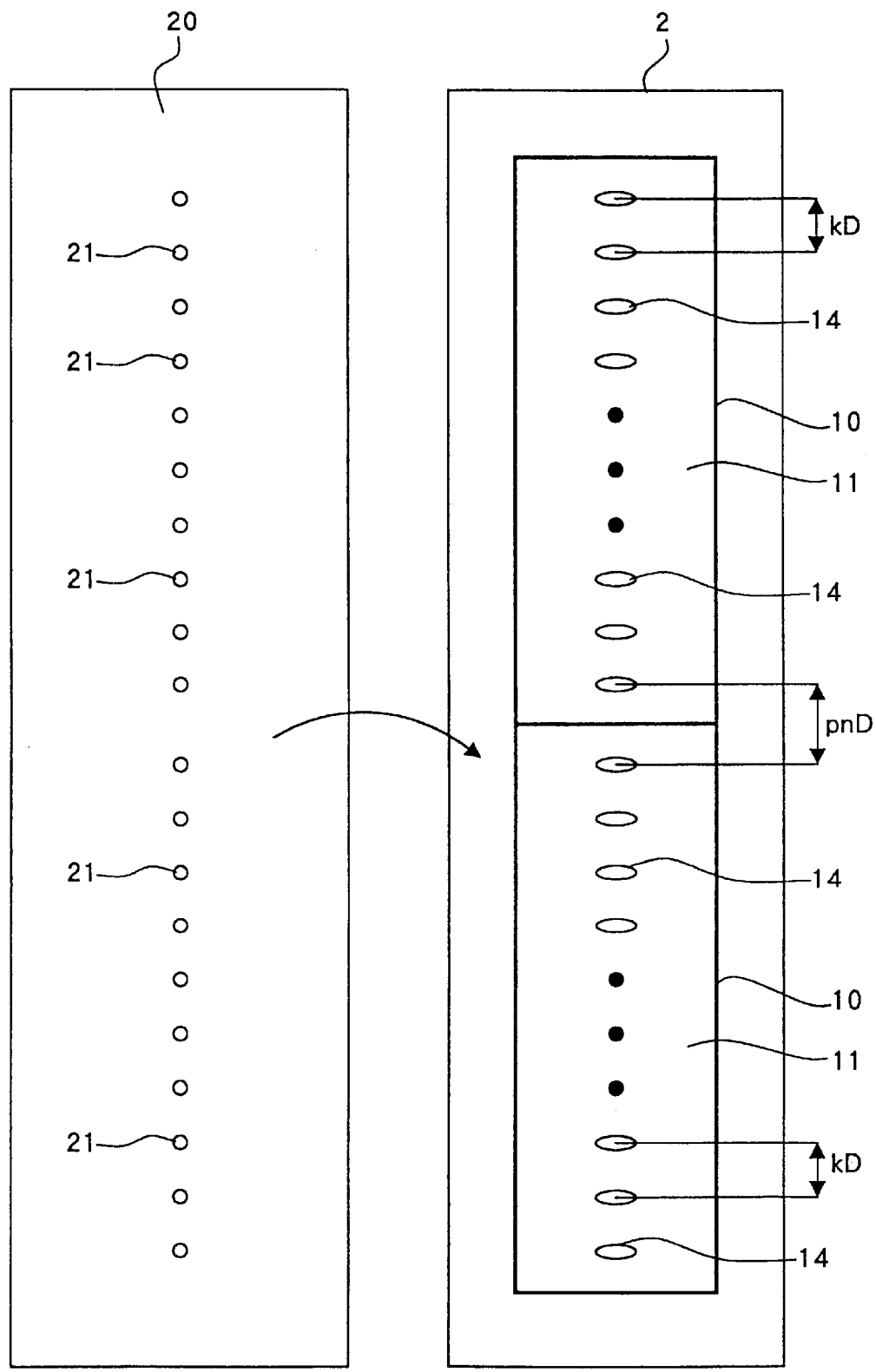
FIG. 7 is a plan view showing the structure of a print head.
Figure 8:
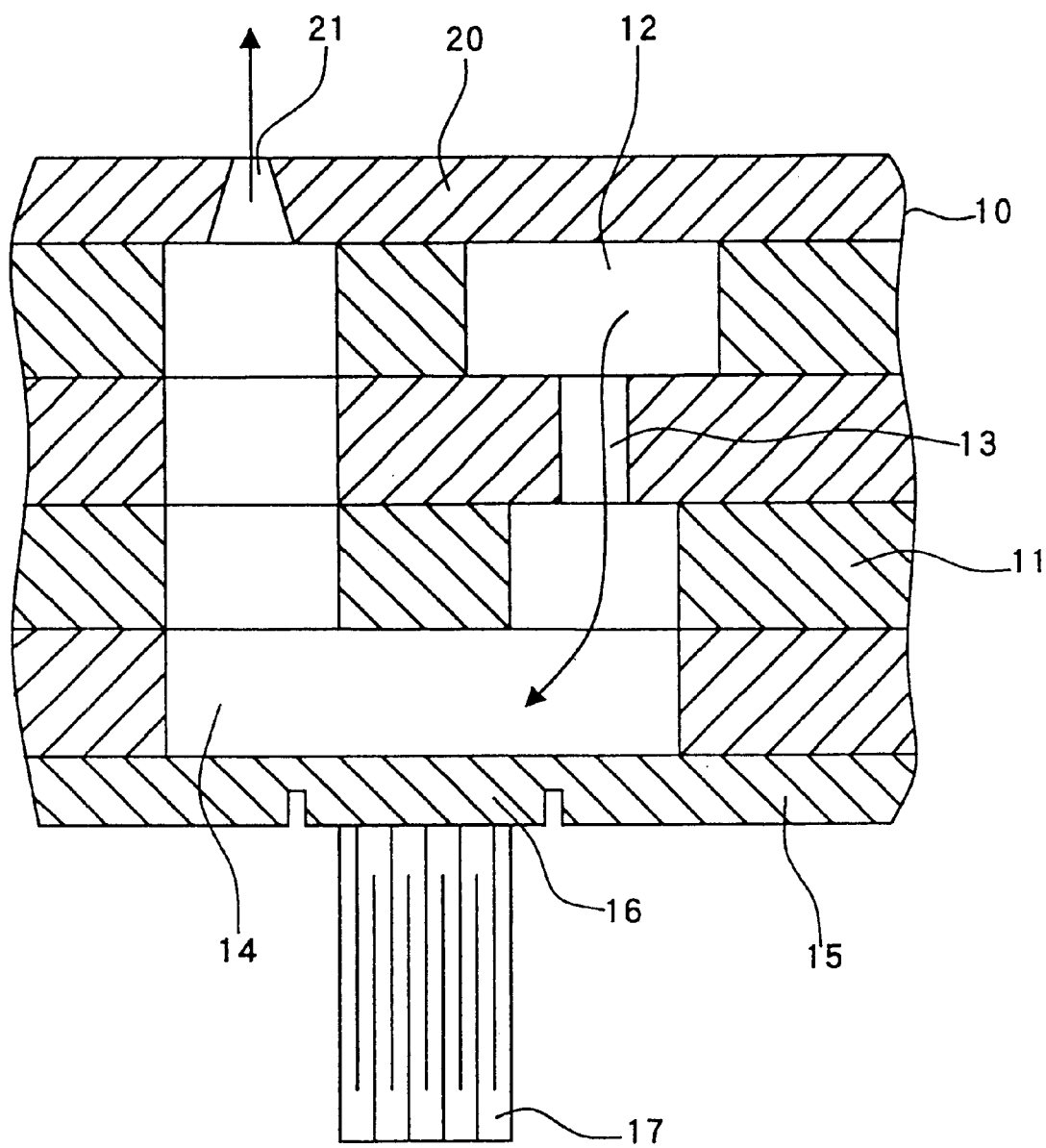
FIG. 8 is a sectional view showing the structure of the print head.

FIGS. 6–8 show an inkjet printer 1 as a printing apparatus according to a first embodiment of the first constant-feed printing scheme of the invention. FIG. 6 is an explanatory diagram showing the overall configuration of the inkjet printer 1. The inkjet printer 1 comprises a print head 2, a main scan driver 3, a sub-scan driver 4, a driver controller 5, a data storage section 6, a print head driver 7 and a main scan speed management table 8, each of which will be explained later. (In this embodiment, "first scanning direction" refers to the main scanning direction (lateral direction in the drawings) and "second scanning direction" to the sub-scanning direction (vertical direction).

The print head 2 has a first nozzle group 2a and a second nozzle group 2b spaced apart in the sub-scanning direction by a prescribed inter-group distance pn·D. The nozzle groups are also referred to as "dot forming element groups." The inter-group distance pn·D is an times the dot pitch D, which corresponds to the printing resolution. When the number of nozzle groups M is 2 as in the case of FIG. 6, a natural number that is not a multiple of 2 (i.e., an odd number) is selected as the inter-group distance an.

As shown in FIG. 7, each of the nozzle groups 2a, 2b is configured as an actuator unit 10, or "dot forming element unit", and each is equipped with N1 number of nozzles as "dot forming elements" (N1=5 in the illustrated example). In other words, N number of nozzles (N=N1+N1=10) are separated into two nozzle groups 2a, 2b. The number of nozzles N is an integer not smaller than 4.

The nozzles of each nozzle group 2a, 2b are spaced in the sub-scanning direction at a nozzle pitch of k·D, or the "element pitch." The nozzle pitch k·D is k times the dot pitch D, where k is an integral multiple of the number of nozzle groups M.

The main scan driver 3, or the "first scan driver", drives the print head 2 in a main scanning direction (laterally in FIG. 6) relative to a printing medium SP consisting of a sheet of printing paper or the like. The sub-scan driver 4, or the "second scan driver", effects driving to convey the printing medium SP in the sub-scanning direction perpendicular to the main scanning direction (vertically in FIG. 6).

The driver controller 5 controls the amount, timing etc. of the driving by the main scan driver 3 and the sub-scan driver 4 so as to move the print head 2 in the main scanning direction. The driver controller 5 also makes the conveyance amount of the printing medium SP by the sub-scan driver 4 equal to N/S times the dot pitch D, i.e., N·D/S, thereby enabling a constant pitch medium conveyance operation mode and effecting control to form dots in accordance with the interlace printing scheme.

In order to form adjacent dot lines with different nozzles, the parameters N, M, S and k have to satisfy the condition of "N/(M·S) and k/M being relatively prime." Since the product M·S of the number of nozzle groups M and the number of group scans S is a factor of the number of nozzles N and the nozzle pitch k is a multiple of the number of nozzle groups M, N/(M·S) and k/M are both integers. In the example shown in FIG. 6, when the number of scans S is made 1, N/(M·S)=10/(2·1)=5 and k/M=4/2=2, so that N/(M·S) and k/M are relatively prime. It is noted that these parameters satisfy the conditions C2a, C2b and C2c.

The data storage section 6 consists of a memory for storing print data supplied from a computer 9. A data block area (not shown) is formed in the memory. The print head driver 7 supplies electric current to the print head 2 based on the print data stored in the data storage section 6. In response, the first nozzle group 2a and the second nozzle group 2b jet ink onto the printing medium SP from prescribed nozzles to produce a printout based on the print data.

The print data supplied from the computer 9 include raster data and sub-scanning feed data. The raster data represent what kind of dot is to be formed at each pixel position. In binary printers, the raster data is expressed in one bit per pixel and represents on/off state of each pixel position. In multilevel printers, on the other hand, the raster data is expressed in at least two bits per pixel and represents the size of dot to be formed. The sub-scanning feed data represent a sub-scanning feed amount after each pass of main scan. The sub-scanning feed data is transferred to the driver controller 5. Such raster data are typically produced by a printer driver stored in a main memory of the computer 9. The printer driver is a computer program which is typically provided to the users of the printers in the form of a computer program product such as CD-ROMs and floppy disks. The printer driver is installed into a hard dick 9a of the computer 9.

The main scan speed management table 8 is used for dynamically controlling the main scan speed VS, or the "first scan direction speed", in accordance with the number of scans S. Specifically, the main scan speed VS, i.e., the speed of print head 2, is stored in the main scan speed management table 8 in association with different print modes with different numbers of scans S. The main scan speed VS1 when the number of scans S is 1, i.e., when every dot line in the main scanning direction is formed by a single scan, is defined as a reference speed and the main scan speed VS increases with the number of scans S. Specifically, the main scan speed VS2 when S=2 is set to double the reference speed VS1 and the main scan speed VS3 when S=3 is set to treble the reference speed VS1. The invention is not limited to this, however, and, for example, it is possible to set the main scan speed VS2 when S=2 to 1.5 times the reference scan speed VS1 or some other value.

A specific example of the print head 2 will now be explained based on FIGS. 7 and 8. FIG. 7 is a plan view of the print head 2. The print head 2 is composed of a plurality (two in FIG. 7) of actuator units 10. The actuator units 10 are separated by an inter-group distance pn·D. Each actuator unit 10 is formed with multiple nozzle actuators.

FIG. 8 is a sectional view of a nozzle actuator. A channel forming plate 11 is formed with an ink chamber 12, an ink feed port 13 and a pressure chamber 14. Ink is fed from an external ink tank (not shown) to the ink chamber 12, and then to the pressure chamber 14 through the ink feed port 13. A vibration plate 15 is provided on the rear side surface of the channel forming plate 11 and is formed with an island portion 16. A piezoelectric vibrator 17 is provided in contact with one side of the island portion 16. The piezoelectric vibrator 17 is formed so as, for example, to contract when electrically charged and expand when discharged.

A nozzle plate 20 has nozzle orifices 21 associated with respective nozzle actuators. The nozzle orifices 21 at each actuator unit 10 are spaced at nozzle pitch kD. As schematically shown in FIG. 7, the print head 2 is completed by providing the nozzle plate 20 on the actuator units 10. It should be noted, however, that the present invention is not limited to the foregoing arrangement. For example, it is possible to adopt instead a configuration which jets ink drops by means of bubbles generated in the ink with microheaters.

Since the nozzle actuators have a complicated structure involving ink channel portions such as the pressure chamber 14 and the piezoelectric vibrator 17, it is difficult to incorporate a large number of the nozzle actuators into a single actuator unit 10 with high uniformity. Since in this embodiment the print head 2 is constituted by arraying multiple actuator units 10, however, a print head 2 equipped with multiple nozzle actuators can be readily obtained.

Figure 9:
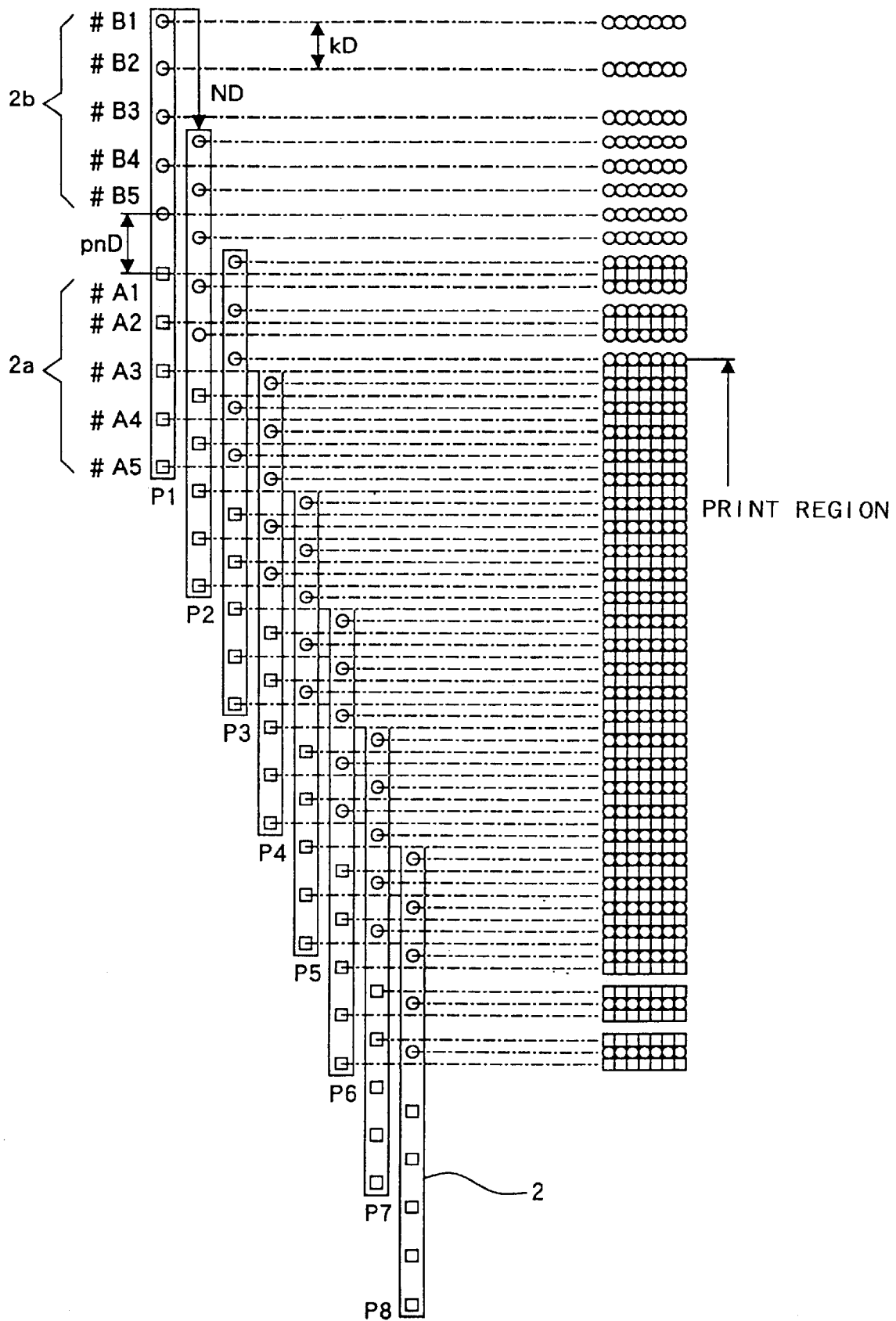
FIG. 9 is an explanatory view showing how print processing is conducted according to the first embodiment of the first printing scheme.

The operation of this embodiment will now be explained based on FIGS. 9 and 10. As explained in the foregoing, in this embodiment the number of nozzle groups M=2, the number of nozzles N=10, the nozzle pitch k=4, the inter-group distance pn=5, the number of scans S=1, and the sub-scan feed amount L=N.

During every main scan pass, the nozzles of the nozzle groups 2a, 2b can form dots by jetting ink drops. Since a constant pitch sub-scan of N dot pitch is effected every main scan, dot lines cannot be densely formed in the sub-scanning direction until the print head 2 and the printing medium SP have come into a prescribed positional relationship. Specifically, the position of nozzle #B3 at the third main scan pass P3 is the start of the print region.

Figure 10:
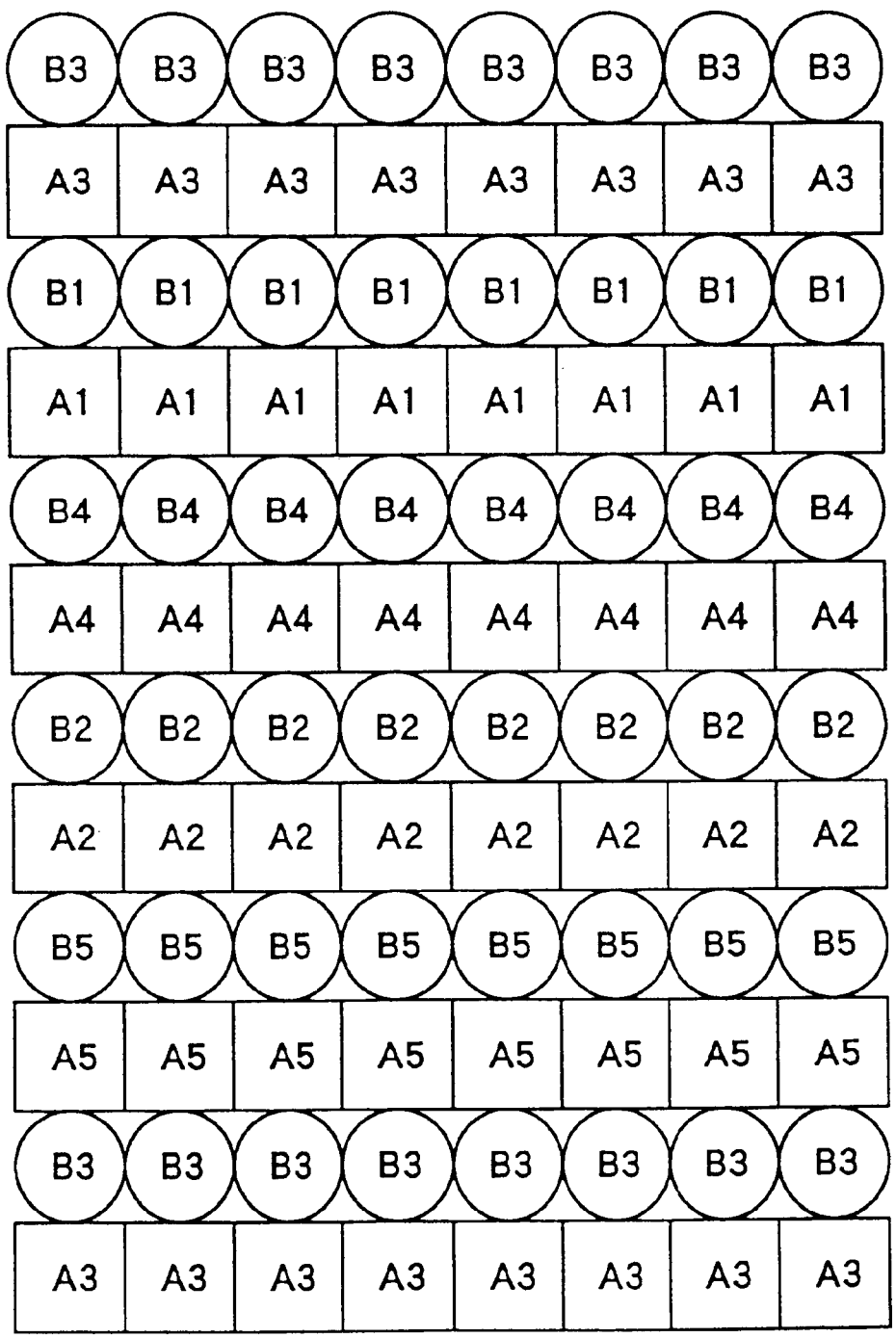
FIG. 10 is an enlarged explanatory view showing the condition of dot formation in FIG. 9.

FIG. 10 is an enlarged explanatory view showing how dots are formed in a section of 12 dot lines from the start of the print region. As shown in FIG. 10, since the number of scans S is 1 in this embodiment, every dot line in the main scanning direction is formed in a single main scan. Moreover, dot lines adjacent in the sub-scanning direction are formed by different nozzles.

The embodiment configured in this manner exhibits the following effects.

First, since the print head 2 is formed by grouping the multiple nozzles (nozzle actuators) into the multiple nozzle groups 2a, 2b and separating the nozzle groups 2a, 2b by the inter-group distance pn·D, whose value is different from that of the nozzle pitch k, a print head 2 equipped with multiple nozzles can be readily obtained. Specifically, the print head 2 can be produced at high yield and low production cost because the nozzle pitch k need be secured only within the nozzle groups 2a, 2b individually.

Second, since the number of used nozzles N, the number of nozzle groups M, the number of scans S and the nozzle pitch k are selected to make N/(M·S) and k/M relatively prime and sub-scanning is effected at a constant pitch that is N/S times the dot pitch D, interlace printing can be achieved with the print head 2 even if the head 2 is locally different in nozzle pitch. Adjacent dot lines can therefore be formed with different nozzles, and the effect of nozzle characteristic variance can be spread out to effect high-quality printing.

Third, since the print head 2 is formed by arraying in the sub-scanning direction multiple actuator units 10 each having multiple nozzle actuators serially aligned in the sub-scanning direction at a nozzle pitch k, print heads with many nozzles can be produced with high uniformity. In addition, print heads 2 with various numbers of nozzles can be obtained simply by changing the number of actuator units 10 used.

B-2. Second Embodiment of First Printing Scheme

A second embodiment of the first printing scheme according to the invention will now be explained based on FIGS. 11 and 12. (In the embodiments that follow, constituent elements identical with those of the first embodiment of the first printing scheme described above are assigned the same reference symbols as those in the first embodiment and will not be explained further.) The feature characterizing this embodiment is that the nozzles are separated into 3 nozzle groups.

Specifically, the print head 31 of this embodiment is composed of a first nozzle group 31a, a second nozzle group 31b and a third nozzle group 31c each having 3 nozzles arrayed at nozzle pitch k. The first nozzle group 31a and the second nozzle group 31b are separated by a first inter-group distance $pn_1 \cdot D$ and the second nozzle group 31b and the third nozzle group 31c are separated by a second inter-group distance $pn_2 \cdot D$. The parameters in this embodiment are: number of used nozzles N=9, number of nozzle groups M=3, number of scans S=1, nozzle pitch k=6, first inter-group distance $pn_1$=8 and second inter-group distance $pn_2$=5. Since N/(M·S)=9/(3·1)=3 and k/M=6/3=2, it follows that N/(M·S) and k/M are relatively prime.

When the inter-group distance $pn_i$ differs between different nozzle groups as in this embodiment, the distances can be determined based on Equation 1.

$$pn_1 = (pn_2 + \alpha \cdot M) \quad \text{(Equation 1)}$$

where $\alpha$ is an integer.

In other words, the first inter-group distance $pn_1$ is the value obtained by adding a multiple of M to the second inter-group distance $pn_2$. In this embodiment, the first inter-group distance $pn_1$ is determined to be $pn_1=(pn_2+\alpha \cdot M)=(5+1\cdot3)=8$. In general, however, it suffices to satisfy the aforesaid condition C2b: "Each of (M−1) values of $(\Sigma pn_i)\% M$ being a different value between 1 and (M−1)."

Figure 11:
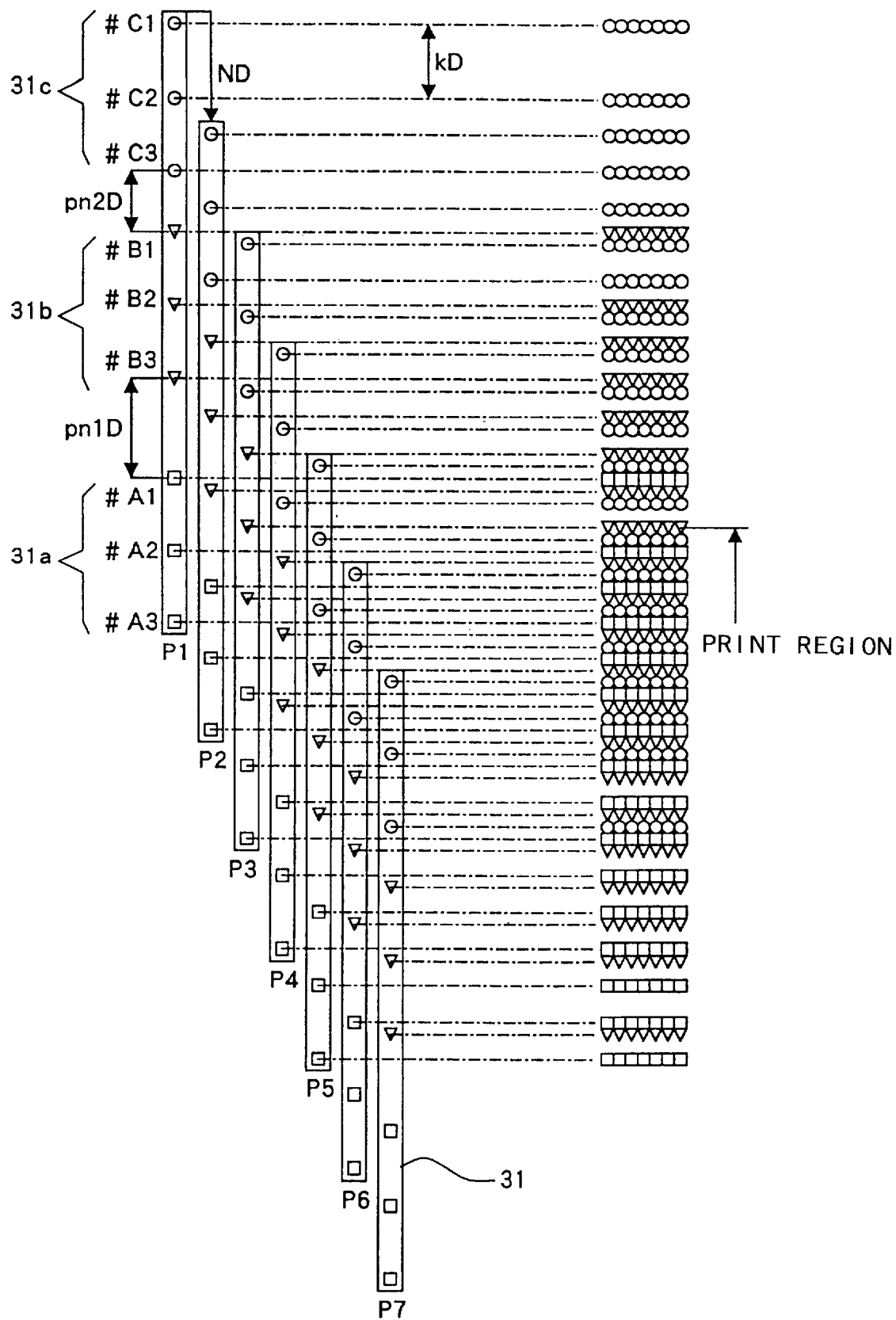
FIG. 11 is an explanatory view showing how print processing is conducted by a printing apparatus according to a second embodiment of the first printing scheme.
Figure 12:
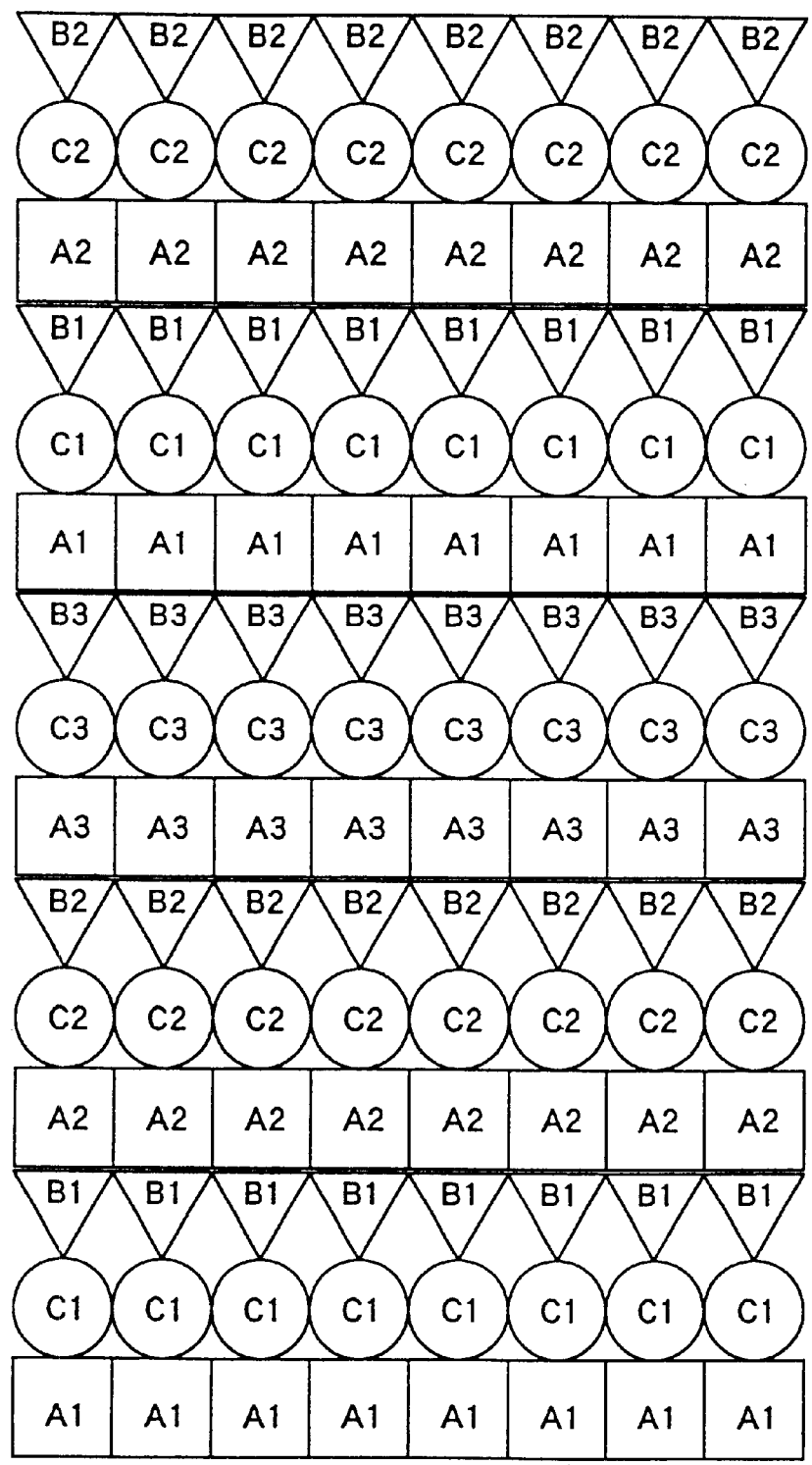
FIG. 12 is an enlarged explanatory view showing the condition of dot formation in FIG. 11.

In this embodiment, as shown in FIG. 11, the position of nozzle #B2 at the third main scan pass P3 is the start of the print region. Dot lines can be densely formed in the sub-scanning direction from here. FIG. 12 is an enlarged explanatory view showing how dots are formed in a section of 15 dot lines from the start of the print region. As shown in FIG. 12, dot lines adjacent in the sub-scanning direction are formed by different nozzles.

The embodiment configured in this manner can therefore also achieve the same effects as the first embodiment of the first printing scheme described earlier.

B-3. Third Embodiment of First Printing Scheme

A third embodiment of the first printing scheme according to the invention will now be explained based on FIGS. 13 and 14. The feature characterizing this embodiment is that every dot line in the main scanning direction is formed by two scans in the main scanning direction.

The print head 41 of this embodiment comprises a first nozzle group 41a and a second nozzle group 41b spaced apart in the sub-scanning direction by an inter-group distance pn·D. The nozzle groups 41a, 41b are respectively formed with 6 nozzles aligned in the sub-scanning direction at a nozzle pitch k·D. The parameters in this embodiment are: number of used nozzles N=12, number of nozzle groups M=2, number of scans S=2, nozzle pitch k=4 and inter-group distance pn=5. Since $N/(M \cdot S)=12/(2 \cdot 2)=3$ and $k/M=4/2=2$, it follows that $N/(M \cdot S)$ and $k/M$ are relatively prime.

Figure 13:
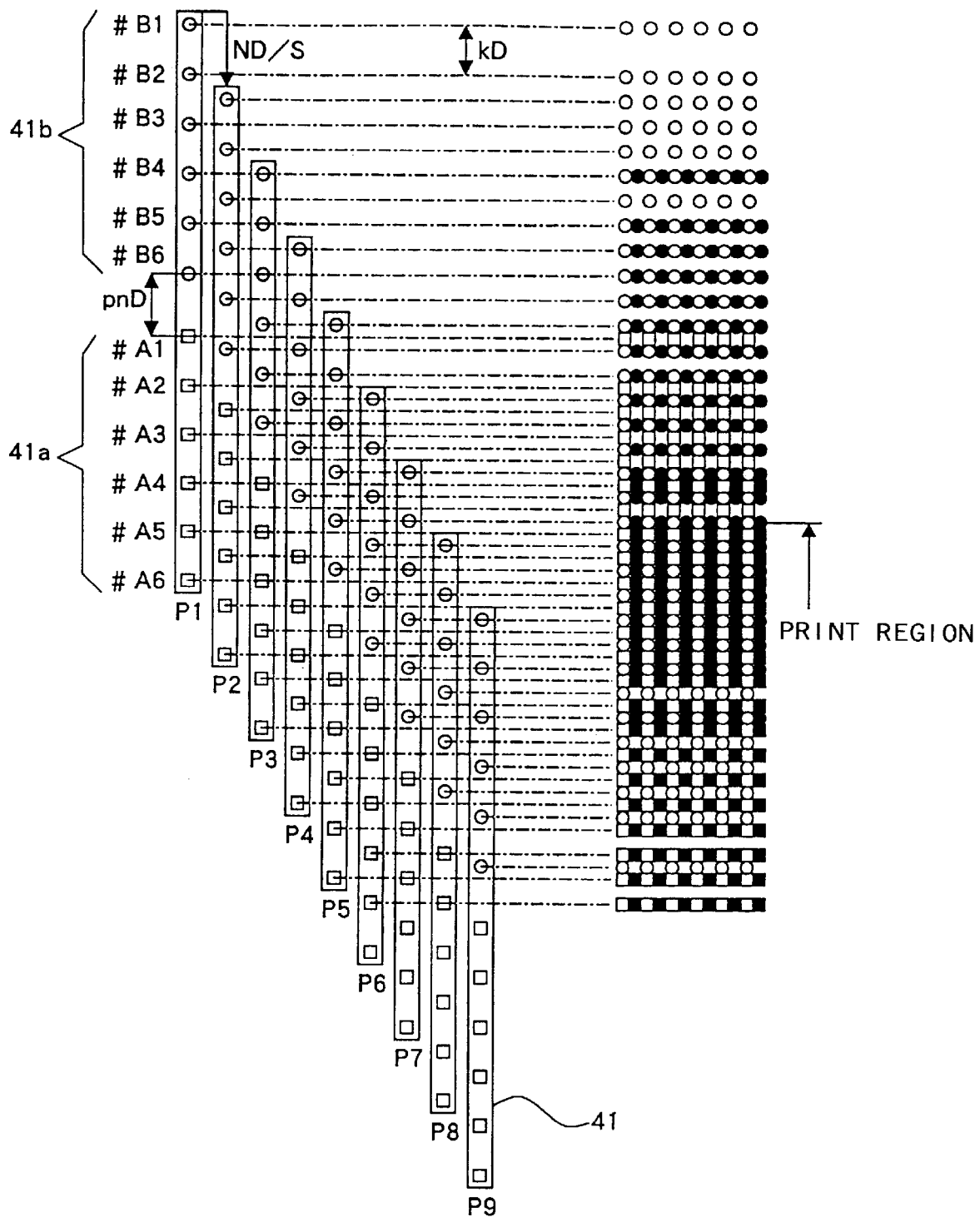
FIG. 13 is an explanatory view showing how print processing is conducted by a printing apparatus according to a third embodiment of the first printing scheme.

As shown in FIG. 13, the position of nozzle #B5 at the fifth main scan pass P5 is the start of the print region in this embodiment. Each dot line is formed by two main scans. FIG. 14 is an enlarged explanatory view showing how dots are formed in a section of 12 dot lines from the start of the print region.

Figure 14:
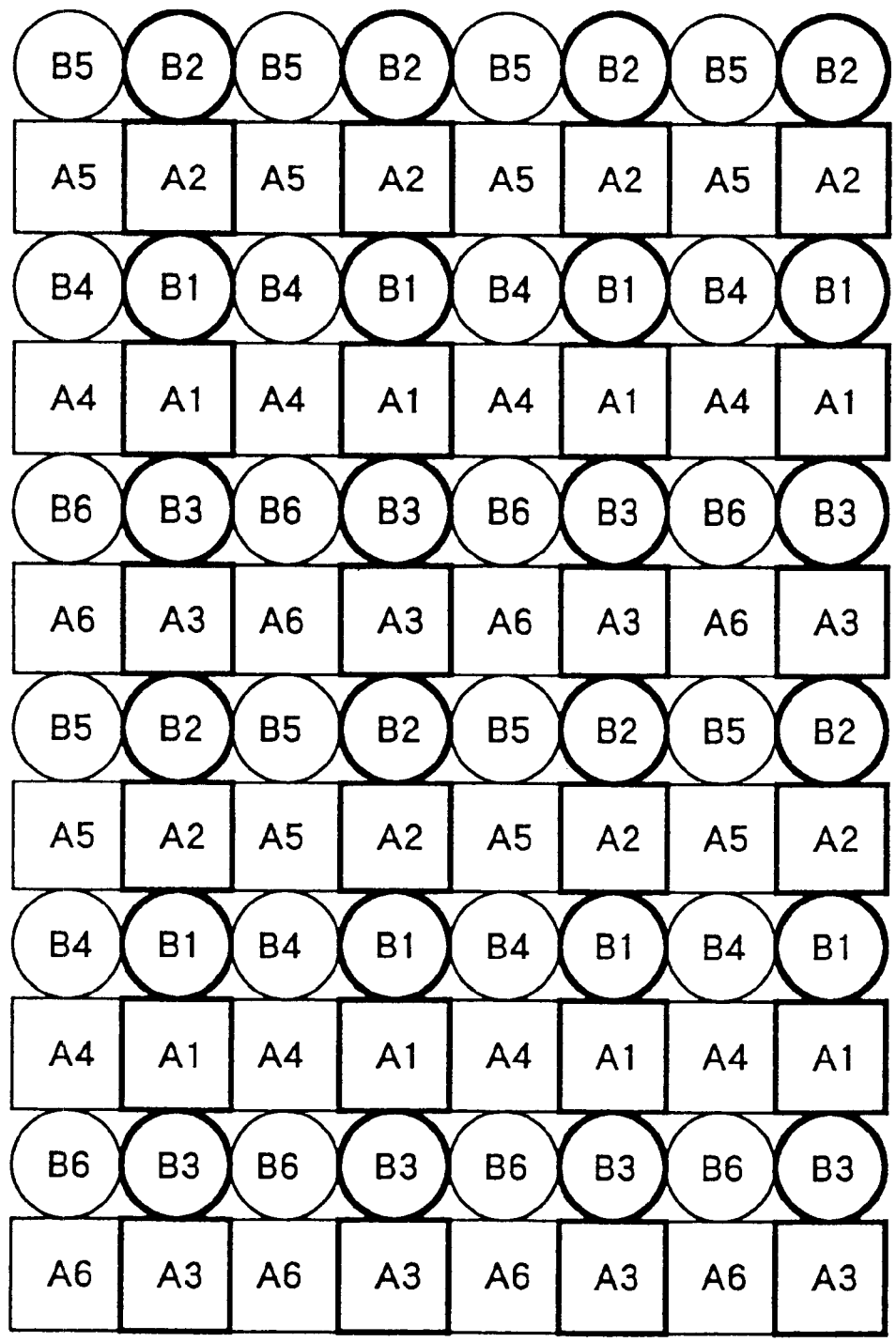
FIG. 14 is an enlarged explanatory view showing the condition of dot formation in FIG. 13.

As shown in FIG. 14, dot lines adjacent in the sub-scanning direction are also formed by different nozzles in this embodiment. In addition, since the number of main scanning direction scans S is 2 in this embodiment, each continuous dot line in the main scanning direction is formed by two main scans. This means that dots adjacent in the main scanning direction are formed by different nozzles. This printing pattern is called "overlap."

Since each raster line is scanned twice, printing is not limited to the overlap pattern shown in FIG. 14 but can also be effected in other types of overlap patterns. In this case, the first main scan forms a continuous dot line and the next main scan overlays new dots on the already formed dots, thus enabling a higher level of multigradation printing.

B-4. Fourth Embodiment of First Printing Scheme

A fourth embodiment of the first printing scheme according to the invention will now be explained based on FIG. 15. The feature characterizing this embodiment is that multiple actuator units are offset from each other in the main scanning direction as well.

Figure 15:
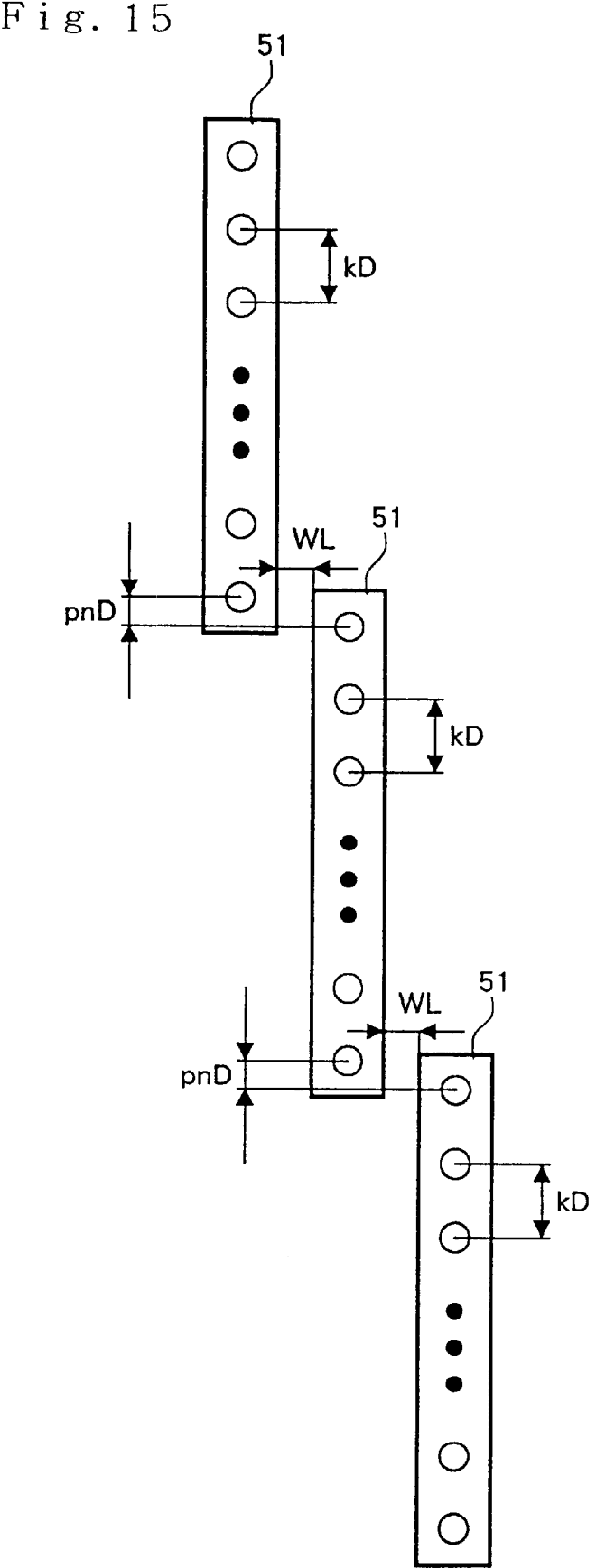
FIG. 15 is an explanatory view showing how print processing is conducted by a printing apparatus according to a fourth embodiment of the first printing scheme of the invention.

As shown in FIG. 15, the print head of this embodiment is composed of multiple actuator units 51. Each actuator unit 51 is formed with multiple nozzles aligned in the sub-scanning direction at a prescribed nozzle pitch k.

Adjacent ones of the actuator units 51 are separated from each other in the sub-scanning direction so that the distance between the nearest nozzles thereof is a prescribed inter-group distance pn·D. The actuator units 51 are further offset from each other in the main scanning direction by a prescribed distance WL.

The embodiment of this configuration also provides a number of nozzle groups equal to the number of actuator units 51. It can therefore produce the same effects as the first embodiment described earlier. Moreover, since the actuator units 51 are offset from each other in the main scanning direction so that they may partly overlap in the sub-scanning direction, the length of the print head in the sub-scanning direction can be shortened.

B-5. Fifth Embodiment of First Printing Scheme

A fifth embodiment of the first printing scheme according to the invention will now be explained based on FIG. 16. The feature characterizing this embodiment is that the print head is formed by arranging in the sub-scanning direction actuator units each having a row of even-numbered nozzles and a row of odd-numbered nozzles.

Specifically, the print head 61 according to this embodiment is equipped with, for example, four nozzle groups 62 spaced in the main scanning direction. The respective nozzle groups 62 are assigned to handle different colors, such as black, cyan, magenta and yellow, and each nozzle group 62 jets ink drops of a single color.

Each nozzle group 62 is composed of multiple actuator units 63 aligned in the sub-scanning direction. Each actuator unit 63 has a row of even-numbered nozzles 63a and a row of odd-numbered nozzles 63b. The two rows are spaced from each other in the main scanning direction, each consisting of multiple nozzles aligned in the sub-scanning direction at a nozzle pitch 2k·D. Actuator units 63 adjacent in the sub-scanning direction are disposed so that the nearest nozzles thereof have a prescribed inter-group distance pn·D.

The embodiment configured in this manner can also achieve the same effects as the first embodiment of the first printing scheme described earlier. Owing to the large nozzle pitch, moreover, this embodiment enables ready production of a multinozzle, high-density print head at low cost.

Figure 16:
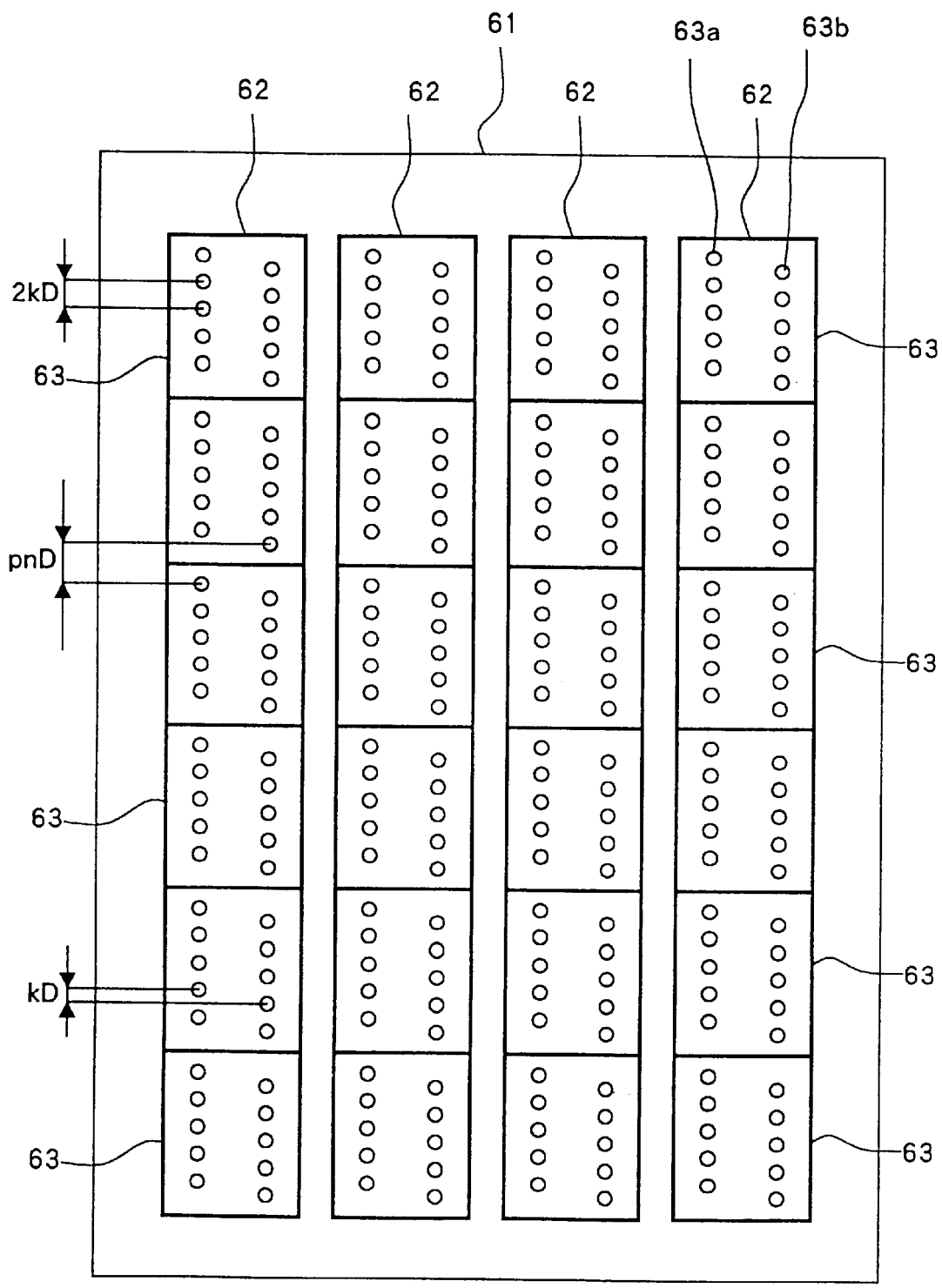
FIG. 16 is an explanatory view showing how print processing is conducted by a printing apparatus according to a fifth embodiment of the first printing scheme.

As is clear from the example of FIG. 16, the N1 number of nozzles included in each nozzle group need not necessarily be disposed along a single straight line. Any arrangement suffices that is capable of forming N1 number of dots substantially aligned in the sub-scanning direction at a constant pitch k.

One skilled in the art will be able to make suitable changes, additions, variations, deletions and the like in respect of the embodiments of the first printing scheme described in the foregoing without departing from the scope of the present invention. For example, while embodiments were explained in which dots are formed along the main scanning direction defined as the first scanning direction, this is not limitative and it is possible instead to adopt a configuration in which printing is effected along the sub-scanning direction defined as the second scanning direction.

Although a serial printer was taken as an example in the embodiments of the first printing scheme, application to a line printer or to a facsimile apparatus, a photographic apparatus or the like is also possible. Application to a multifunction printing apparatus incorporating various features, e.g., facsimile capability, is also feasible.

As is clear from the foregoing explanation, the first printing scheme according to the invention differentiates the inter-group distance an between the dot forming element groups from the element pitch k between the dot forming elements in the dot forming element groups, thereby enabling ready formation of a print head having a large number of dot forming elements. In addition, since it selects the parameters N, M, S and to make N/(M·S) and k/M relatively prime and conveys the printing medium at a constant pitch that is N/S times the dot pitch D, interlace printing can be achieved even though the presence of the intervening inter-group distance an causes the element pitch of the dot forming elements to differ locally within the head.

C. Embodiments of Second Constant-feed Printing Scheme

C-1. First Embodiment of Second Printing Scheme

The second printing scheme can use a hardware configuration substantially the same as that of the first printing scheme shown in FIGS. 6–8. FIG. 17 is an explanatory view showing how print processing is conducted according to a first embodiment of the second constant-feed printing scheme.

A print head 71 has a first nozzle group 71a and a second nozzle group 71b, or "dot forming element groups," spaced apart in the sub-scanning direction by a prescribed inter-group distance pn·D. The intergroup distance pn·D is an times the dot pitch D. A positive integer other than k can be selected as the inter-group distance an.

Each of the nozzle groups 71a, 71b is equipped with N1 number of nozzles as "dot forming elements" (N=5 in the illustrated example) In other words, N number of nozzles (N=N1+N1=10) are separated into two nozzle groups 71a, 71b.

The number of nozzles N is an integer not smaller than 4. The number of nozzles N and number of nozzle groups M (an integer not smaller than 2) are unequal.

The conveyance amount of the printing medium SP by the sub-scan driver 4 is N/(M·S) times the dot pitch D, i.e., N·D/(M·S). This constant pitch conveyance operation mode enables the interlace printing scheme.

In order to form adjacent dots with different nozzles, the parameters N, M, S and k have to satisfy the condition of "N/(M·S) and k being relatively prime." Since the number of raster line scans M·S, i.e., the product of the number of nozzle groups M and the number of group scans S, is a factor of the number of nozzles N and the nozzle pitch k is a positive integer, N/(M·S) and k are both integers. When the number of group scans S is 1 in the example shown in FIG. 17, N/(M S)=10/(2·1)=5 and k=4, so that N/(M·S) and k are relatively prime. The number of group scans S here refers to the number of scans executed by each nozzle group, and the number of raster line scans M·S is the number of scans for forming one dot line in the main scanning direction (i.e., one raster line) by the scans of the individual nozzle groups. These parameters satisfy the aforesaid conditions C3a, C3b and C3c.

The print head driver 7 (FIG. 6) supplies electric current to the print head 71 based on the print image data stored in the data storage section 6. In response, the first nozzle group 71a and the second nozzle group 71b jet ink onto the printing medium SP from prescribed nozzles to produce a printout based on the print data.

In the second printing scheme, the main scan speed management table 8 (FIG. 2) is used for dynamically controlling the main scan speed VS, or the "first scan direction speed", in accordance with the number of raster line scans M·S in the main scanning direction. Specifically, the main scan speed VS, i.e., the speed of print head 71, is stored in the main scan speed management table 8 in association with different print modes with different numbers of scans M·S. The main scan speed VS1 when the number of group scans S is 1, i.e., when every dot line in the main scanning direction is formed by a single scan of a single nozzle group, is defined as a reference speed and the main scan speed VS increases with the number of group scans S. Specifically, the main scan speed VS2 when S=2 is set to double the reference speed VS1 and the main scan speed VS3 when S=3 is set to treble the reference speed VS1. The invention is not limited to this, however, and, for example, it is possible to set the main scan speed VS2 when S=2 to 1.5 times the reference speed VS1 or some other value. Although the main scan speed preferably increases also in proportion to the number of nozzle groups M, it may not be dependent on the number of nozzle groups M and can be set as a function of only the number of group scans S.

Figure 17:
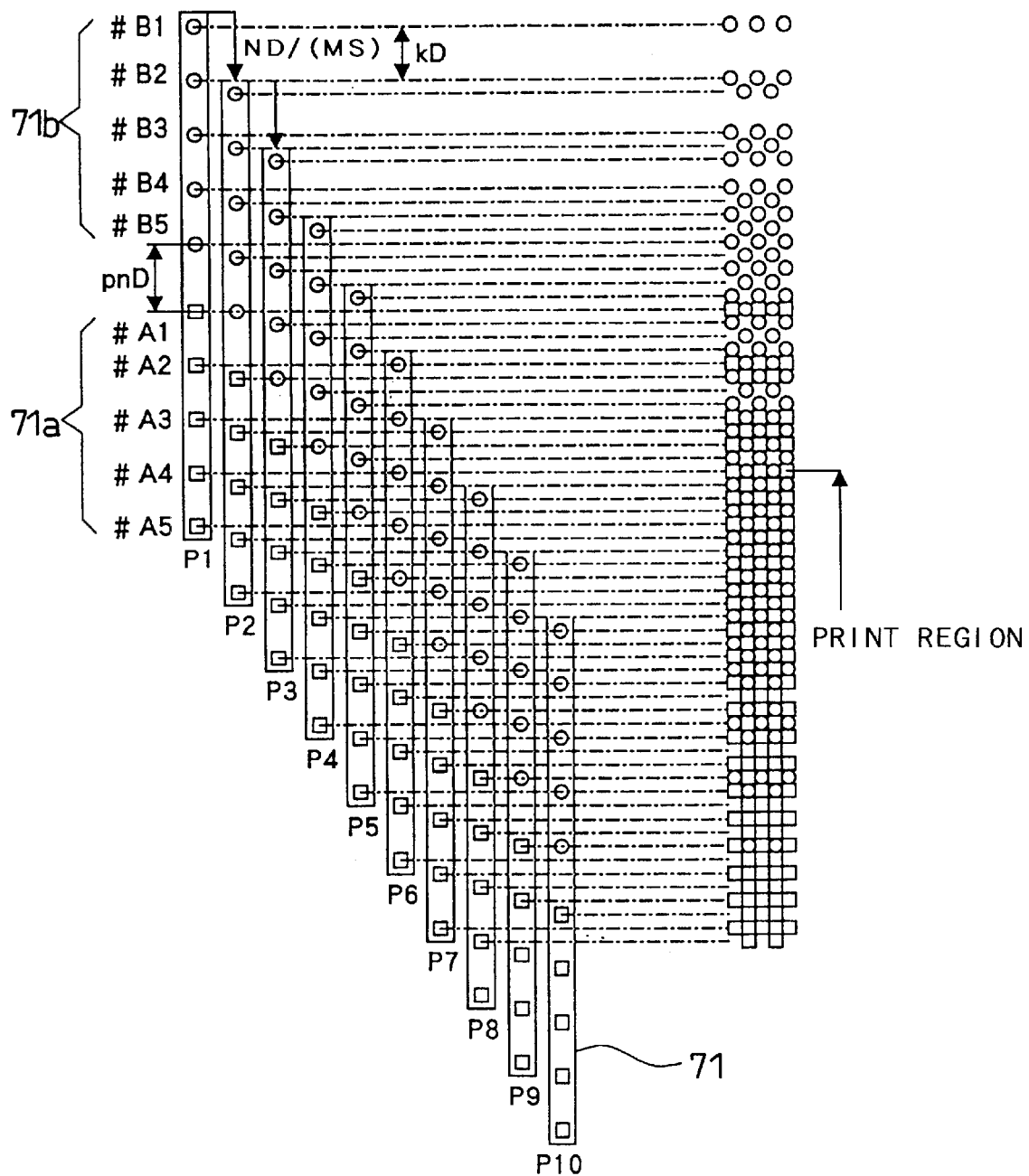
FIG. 17 is an explanatory view showing how print processing is conducted according to a first embodiment of the second printing scheme of the invention.

As explained in the foregoing, in the embodiment shown in FIG. 17 the number of nozzle groups M=2, the number of nozzles N=10, the nozzle pitch k=4, the inter-group distance pn=5, the number of group scans S=1, and the sub-scan feed amount N/(M·S)=10/2=5.

During every main scan pass, the nozzles of the nozzle groups 71a, 71b can form dots by jetting ink drops. Since a constant pitch sub-scan of N/(M·S) dot pitch is effected after every main scan, dot lines cannot be densely formed in the sub-scanning direction until the print head 71 and printing medium SP have come into a prescribed positional relationship. Specifically, the position of nozzle #A4 at the first main scan pass P1 is the start of the print region. Moreover, since the nozzle groups 71a, 71b respectively effect interlace printing, both nozzle groups 71a, 71b contribute to form every raster line. That is, since overlap printing is effected by the second printing scheme of the invention, every raster line in the print region is formed by both the nozzle groups 71a, 71b.

Figure 18:
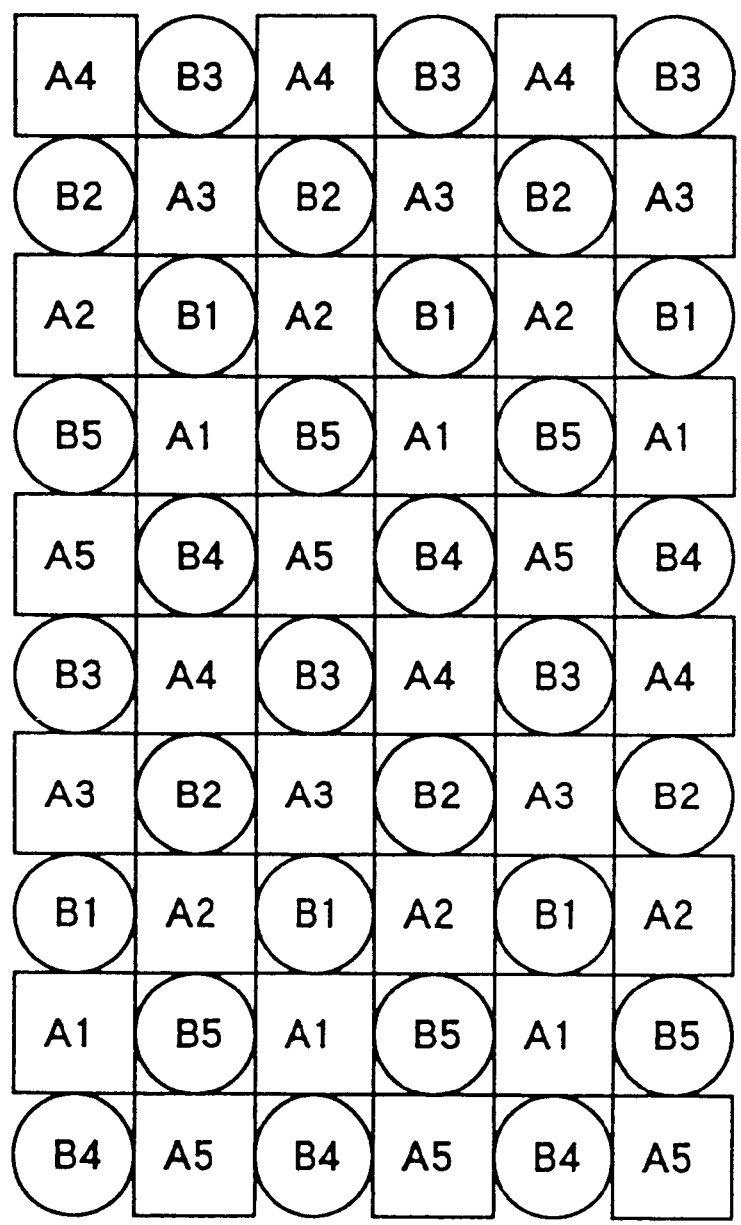
FIG. 18 is an enlarged explanatory view showing the condition of dot formation in FIG. 17.

FIG. 18 is an enlarged explanatory view showing how dots are formed in a section of 10 dot lines from the start of the print region. As shown in FIG. 18, since the number of group scans S is 1 in this embodiment, every dot line in the main scanning direction is formed by one main scan of the first nozzle group 71a and one main scan of the second nozzle group 71b.

Specifically, each dot line is formed of dots printed by the first nozzle group 71a (indicated by squares) and dots printed by the second nozzle group 71b (indicated by circles). Moreover, dot lines adjacent in the sub-scanning direction are formed by different nozzles.

The embodiment configured in this manner exhibits the following effects.

First, since the print head 71 is formed by grouping the multiple nozzles (nozzle actuators) into the multiple nozzle groups 71a, 71b and separating the nozzle groups 71a, 71b by the inter-group distance an, a value differing from the nozzle pitch k, a print head 71 equipped with multiple nozzles can be readily obtained. Specifically, the print head 71 can be produced at high yield and low production cost because the nozzle pitch k need be secured only within the nozzle groups 71a, 71b individually.

Second, since the number of used nozzles N, the number of nozzle groups M, the number of group scans S and the nozzle pitch k are selected to make N/(M·S) and k relatively prime and sub-scanning is effected at a constant pitch that is N/(M·S) times the dot pitch D, interlace printing can be achieved with the print head 71 which is locally different in nozzle pitch. Since adjacent dot lines can therefore be formed with different nozzles, the effect of nozzle characteristic variance can be spread out to effect high-quality printing.

Third, since in this embodiment both of the nozzle groups 71a, 71b scans every raster line in the print region, overlap printing can be effected.

Fourth, since the print head 71 is formed by arraying in the sub-scanning direction multiple actuator units each having multiple nozzle actuators serially aligned in the sub-scanning direction at a nozzle pitch k, print heads with many nozzles can be produced with high uniformity. In addition, print heads 71 with various numbers of nozzles can be obtained simply by changing the number of actuator units 10 used.

In particular, since the inter-group distance an can be any positive integer other than the nozzle pitch k and is subject to no other restriction, a multinozzle print head 71 can be easily obtained by integrating multiple actuator units.

Since this embodiment effects "overlap" by offsetting the positions of the dots formed by the nozzle groups 71a, 71b by one dot in the main scanning direction every sub-scanning direction dot line, it forms dots in a checkered pattern. The pattern of dot formation is not limited to this, however, and it is instead possible, as in the second embodiment described below, to align the dot forming positions of each nozzle group in the sub-scanning direction.

C-2. Second Embodiment of Second Printing Scheme

A second embodiment of the second printing scheme according to the invention will now be explained based on FIGS. 19 and 20. The feature characterizing this embodiment is that the nozzles are divided into 3 nozzle groups.

Specifically, the print head 81 of this embodiment is composed of a first nozzle group 81a, a second nozzle group 81b and a third nozzle group 81c each having 3 nozzles arrayed at nozzle pitch k. Each adjacent pair of nozzle groups, i.e., the first and second nozzle groups 81a and 81b and the second and third nozzle groups 81b and 81c, is separated by an inter-group distance pn·D. The parameters in this embodiment are: number of used nozzles N=9, number of nozzle groups M=3, number of group scans S=1, nozzle pitch k=4 and inter-group distance pn=5. Since N/(M·S)=9/(3·1)=3 and k=4, it follows that N/(M·S) and k are relatively prime.

Although the inter-group distance separating the first nozzle group 81 from the second nozzle group 81b and the inter-group distance separating the second nozzle group 81b from the third nozzle group 81c are both defined as the an in this embodiment, the inter-group distances are not required to be equal and either can be any integer other than k. This is because the nozzle groups 81a, 81b, 81c each independently scans all the raster lines to effect interlace printing.

Figure 19:
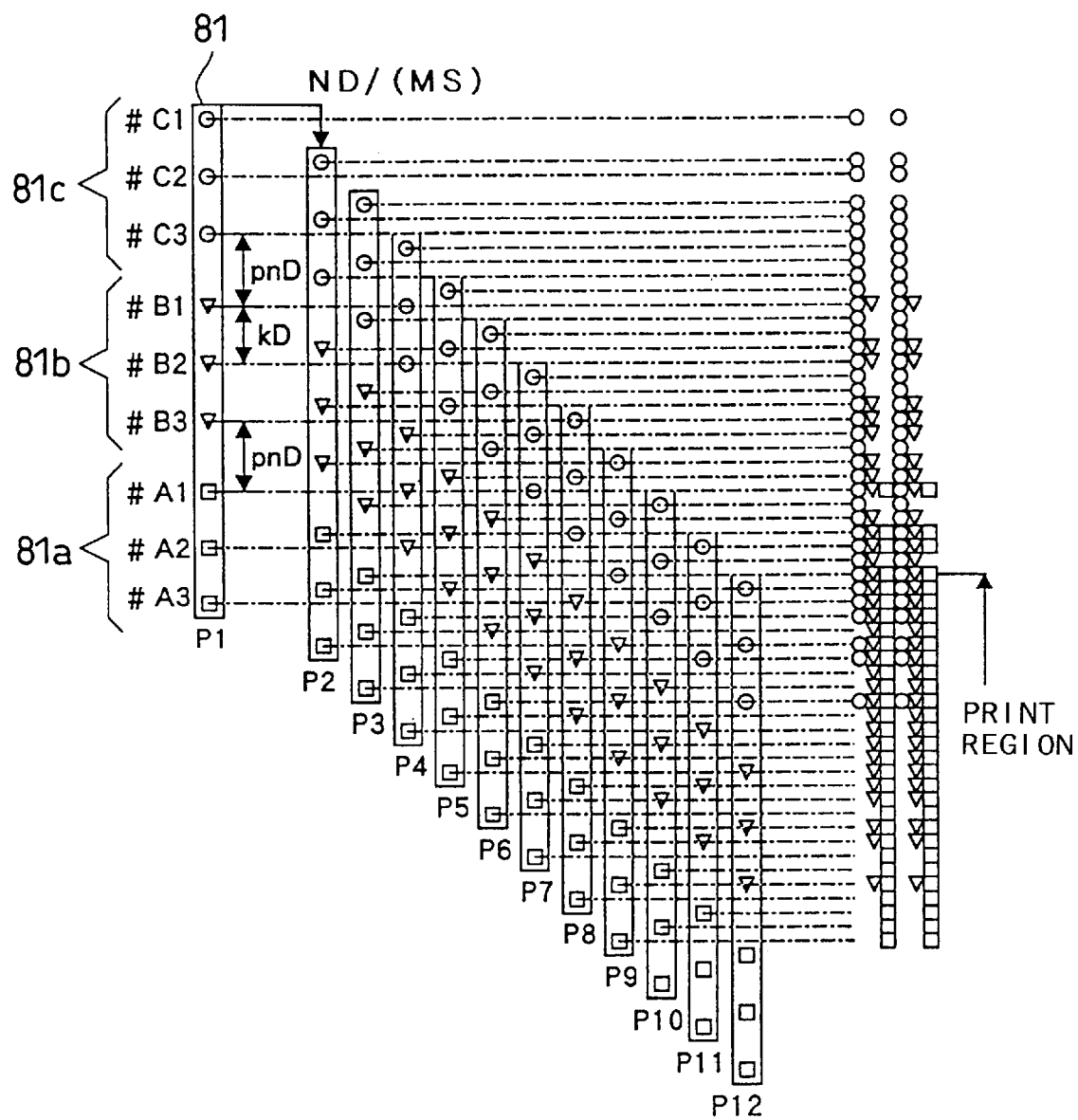
FIG. 19 is an explanatory view showing how print processing is conducted by a printing apparatus according to a second embodiment of the second printing scheme.
Figure 20:
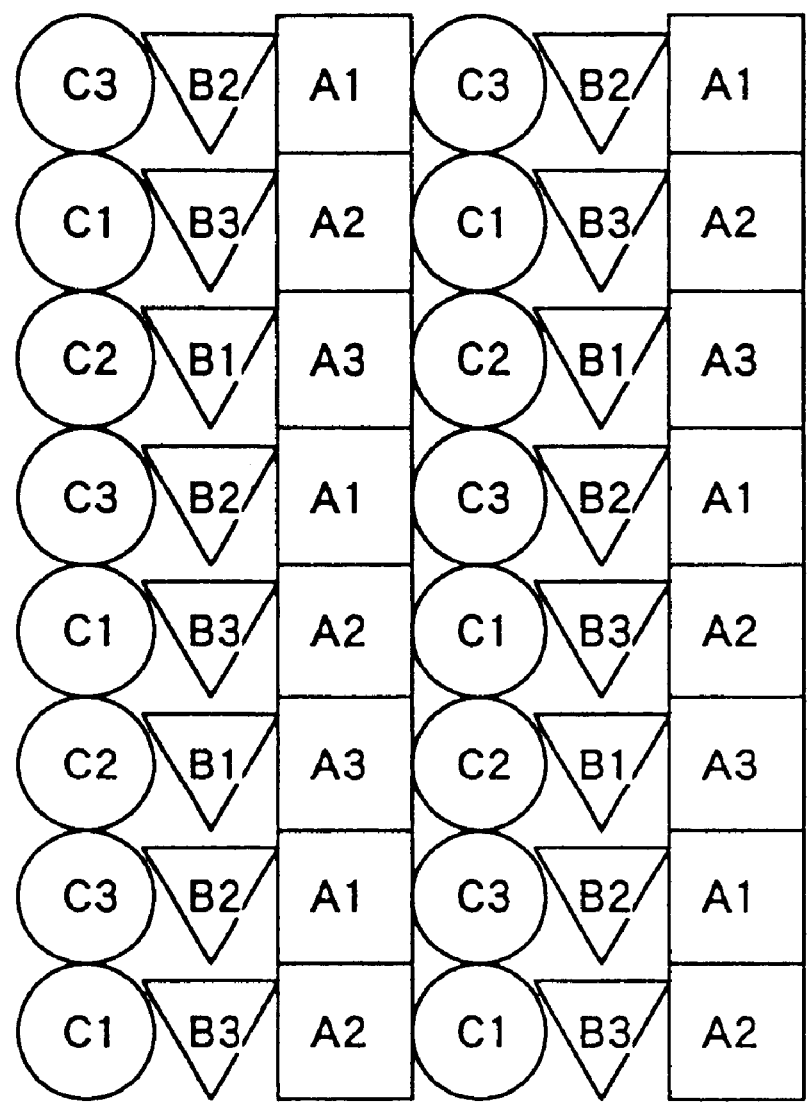
FIG. 20 is an enlarged explanatory view showing the condition of dot formation in FIG. 19.

In this embodiment, as shown in FIG. 19, the position of nozzle #A1 at the third main scan pass P3 is the start of the print region. Dot lines can be densely formed in the sub-scanning direction from here. FIG. 20 is an enlarged explanatory view showing how dots are formed in a section of 8 dot lines from the start of the print region. As shown in FIG. 20, dot lines adjacent in the sub-scanning direction are formed by different nozzles.

The embodiment configured in this manner can therefore also achieve the same effects as the first embodiment of the second printing scheme described earlier.

C-3. Third Embodiment of Second Printing Scheme

A third embodiment of the second printing scheme according to the invention will now be explained based on FIGS. 21 and 22. The feature characterizing this embodiment is that every dot line in the main scanning direction is formed by two scans of each nozzle group in the main scanning direction.

The print head 91 of this embodiment comprises a first nozzle group 91a and a second nozzle group 91b spaced apart in the sub-scanning direction by an inter-group distance pn·D. The nozzle groups 91a, 91b are respectively formed with 6 nozzles aligned in the sub-scanning direction at a nozzle pitch k·D. The parameters in this embodiment are: number of used nozzles N=12, number of nozzle groups M=2, number of group scans S=2, nozzle pitch k=4 and inter-group distance pn=5. Since N/(M·S)=12/(2·2)=3 and k=4, it follows that N/(M·S) and k are relatively prime.

Figure 21:
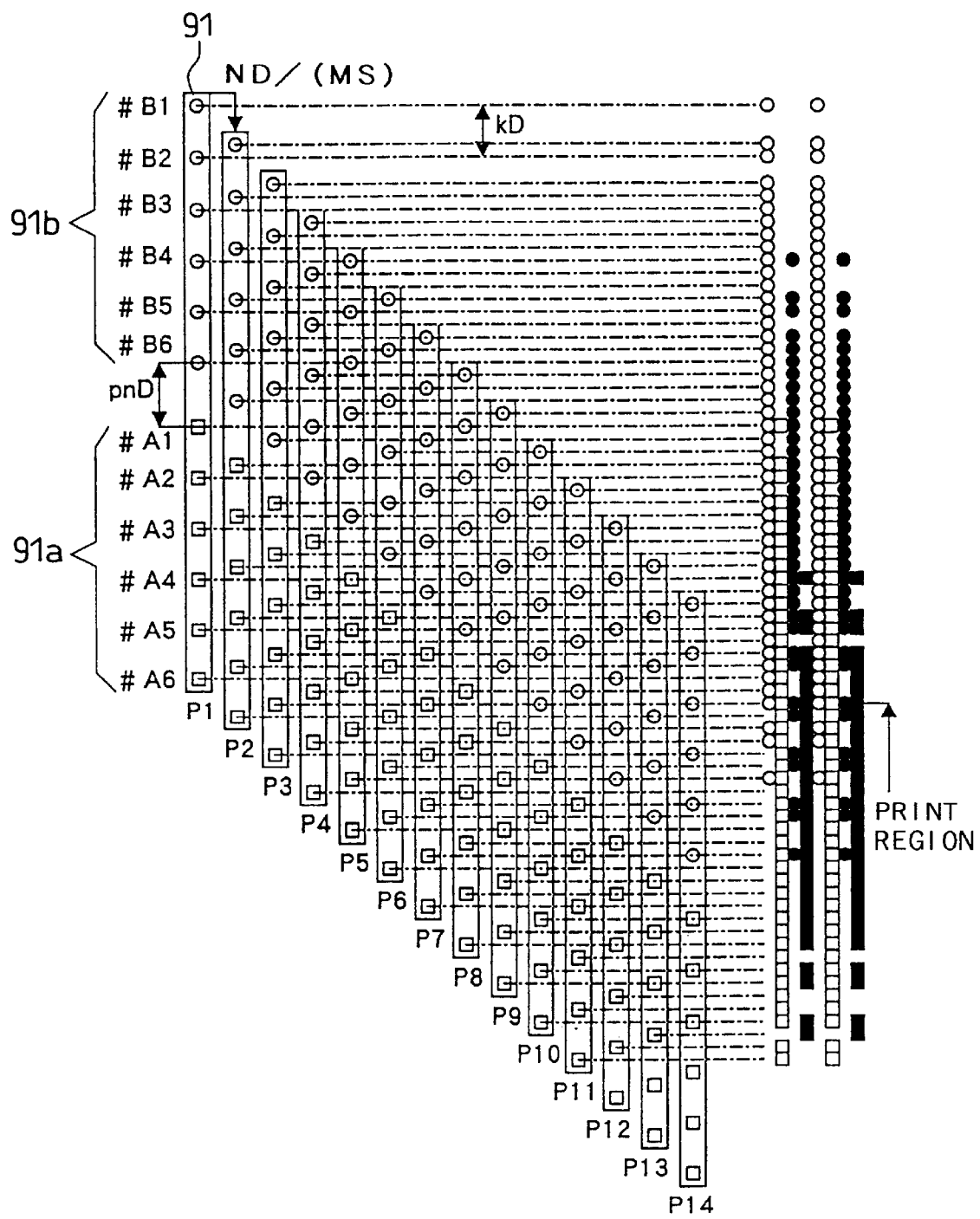
FIG. 21 is an explanatory view showing how print processing is conducted by a printing apparatus according to a third embodiment of the second printing scheme.

As shown in FIG. 21, the position of nozzle #A5 at the third main scan pass P3 is the start of the print region in this embodiment. Each dot line is formed by two main scans of each of the nozzle groups 91a, 91b. Since each of the nozzle groups 91a, 91b scans each raster line twice (S=2), every line is composed of 4 kinds of dots, two kinds indicated by blank and solid circles and two kinds indicated by blank and solid squares.

Figure 22:
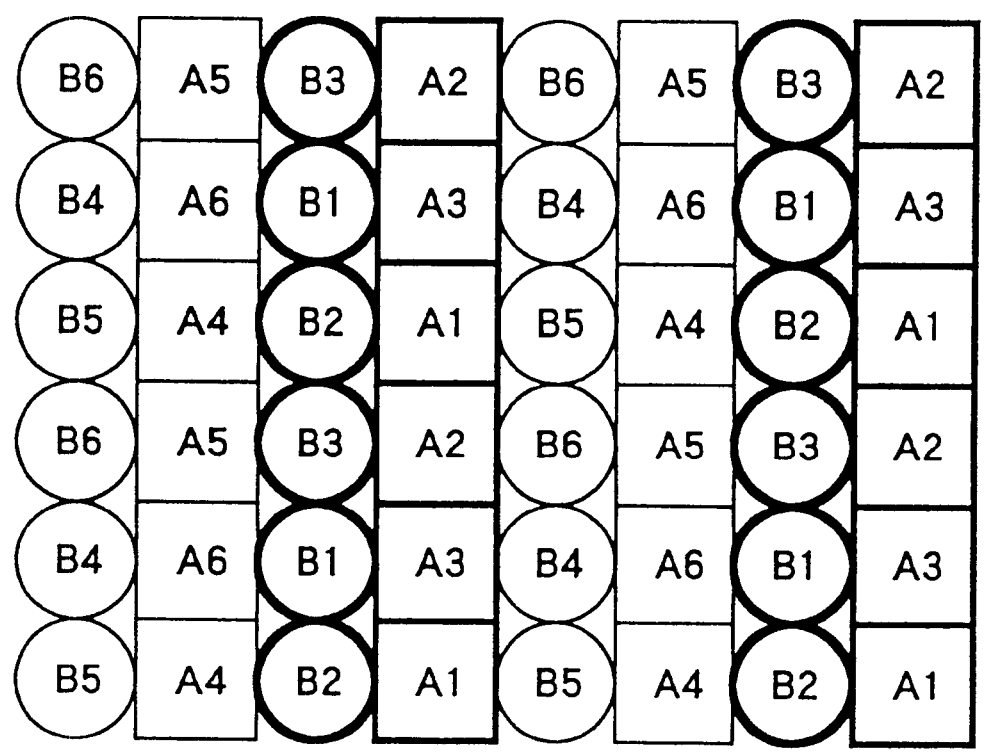
FIG. 22 is an enlarged explanatory view showing the condition of dot formation in FIG. 21.

FIG. 22 is an enlarged explanatory view showing how dots are formed in a section of 6 dot lines from the start of the print region. As shown in FIG. 22, dots adjacent in the sub-scanning direction are also formed by different nozzles in this embodiment. In addition, since the number of group scans S is defined as 2 in this embodiment, each continuous dot line in the main scanning direction is formed by two main scans by each of the nozzle groups 91a, 91b. In every dot line, therefore, dots adjacent in the main scanning direction are formed by a combination of four different nozzles.

C-4. Fourth Embodiment of Second Printing Scheme

Figure 23:
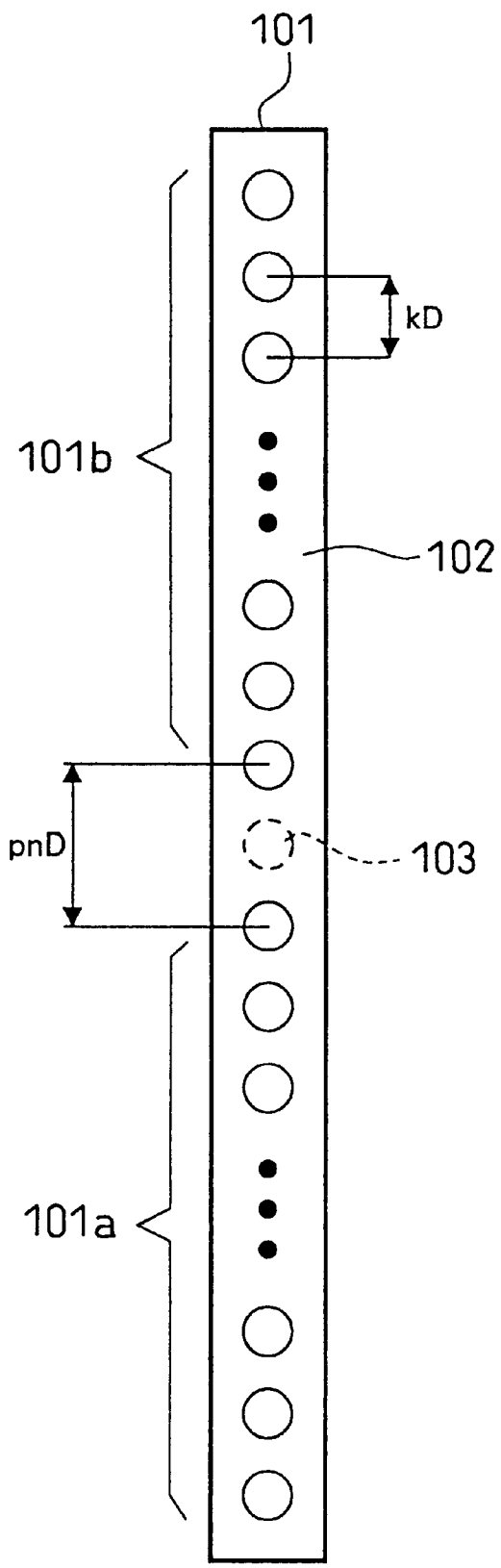
FIG. 23 is an explanatory view showing how print processing is conducted by a printing apparatus according to a fourth embodiment of the second printing scheme of the invention.

A fourth embodiment of the second printing scheme according to the invention will now be explained based on FIG. 23. The feature characterizing this embodiment is that a single actuator unit is used and the nozzles are grouped into multiple nozzle groups by inactivating some nozzles.

Specifically, the print head 101 of this embodiment is formed of a single actuator unit 102 having multiple nozzles aligned in the sub-scanning direction at a prescribed nozzle pitch k·D. In this embodiment, a prescribed nozzle, the nozzle 103 indicated by a broken line, is inactivated to divide the nozzles into a first nozzle group 101a and a second nozzle group 101b.

The inter-group distance an between the nozzle groups 110a, 101b resulting from the inactivation the prescribed nozzle 103 is twice the nozzle pitch k.

The embodiment configured in this manner also achieves the same effects as the first embodiment of the second printing scheme described earlier. In addition, since this embodiment is configured to effect the interlace printing that is a feature of this invention by inactivating at least one nozzle to divide the total number of nozzles into the multiple nozzle groups 101a, 101b, interlace printing can be effected even when the actuator unit 102 has a missing or defective nozzle by selecting the missing or defective nozzle as an inactivated nozzle.

C-5. Fifth Embodiment of Second Printing Scheme

A fifth embodiment of the second printing scheme according to the invention will now be explained based on FIGS. 24 and 25. The feature characterizing this embodiment is that N number of nozzles are separated into BN number of blocks and that M number (M=N/BN) of nozzle groups are configured by nozzles at the corresponding places in the blocks.

Figure 24:
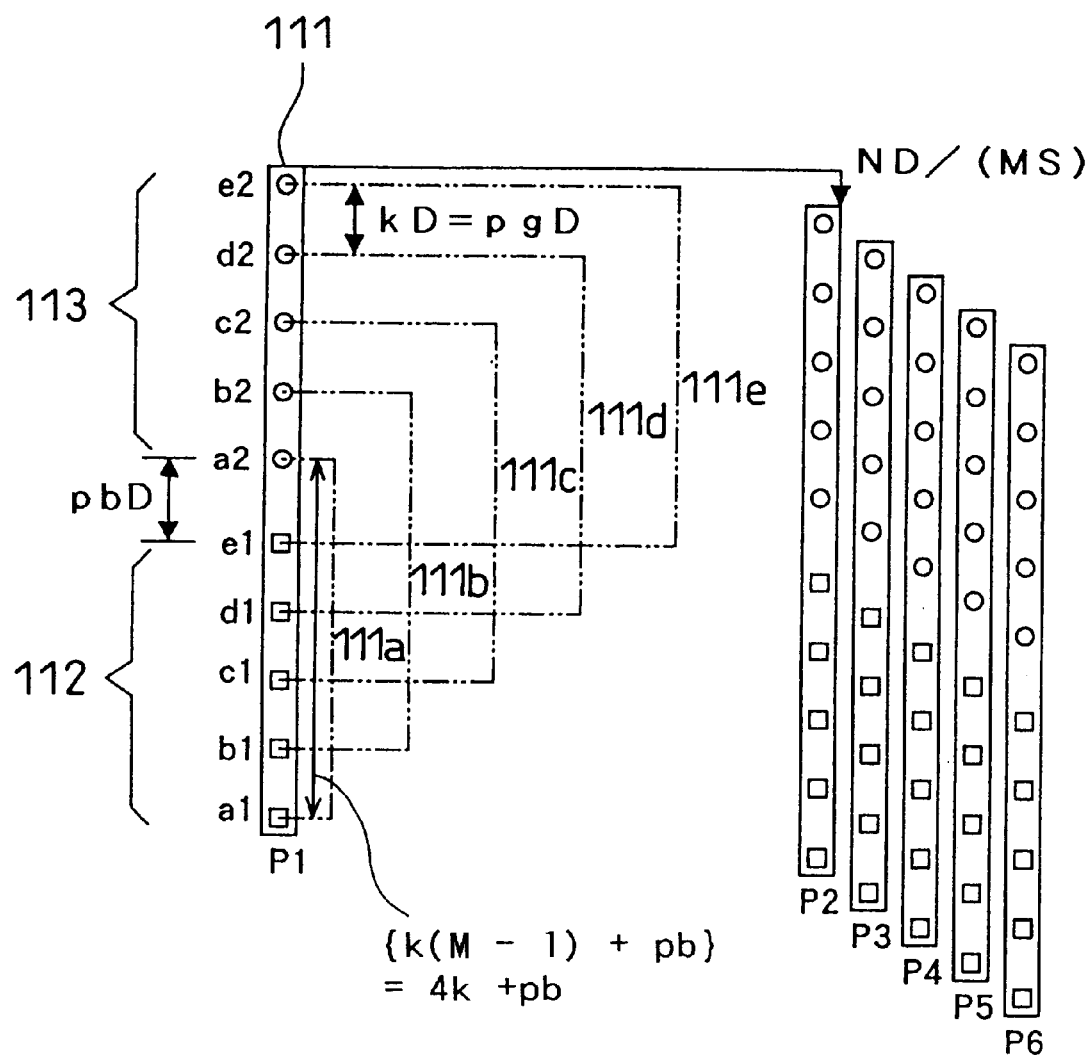
FIG. 24 is an explanatory view showing the structure and other aspects of the print head of a printing apparatus according to a fifth embodiment of the second printing scheme.

FIG. 24 is an explanatory view showing the structure and other aspects of the print head 111 of this embodiment. The print head 111 is formed with N number (N=10) of nozzles separated into BN number (BN=2) of blocks. The nozzle pitch k in each block is 4 and the inter-block distance pb between the blocks is 5. The physical layout of the nozzles is therefore the same as that of the first embodiment of the second printing scheme shown in FIG. 17.

In this embodiment, however, the structural unit in terms of drive control for controlling the driving of the nozzles, i.e., the nozzle grouping, differs from that of the first embodiment. Since each block includes N/BN number (N/BN=10/2=5) of nozzles, the nozzles of each block are located at 1st through (N/BN)-th places within the block.

This will be explained with reference to FIG. 24. The print head 111 is composed of two blocks 112 and 113, and each of the blocks 112, 113 has five nozzles. The nozzles in each block are labeled with a through e, for convenience of illustration. In other words, the first block 112 has five nozzles labeled a1 through e1 and the second block 113 has five nozzles labeled a2 through e2.

In this embodiment, two nozzles of the corresponding places in the blocks 112, 113 form a nozzle group. Specifically, five nozzle groups are formed: a first nozzle group 111a consisting of the nozzles a1 and a2, a second nozzle group 111b consisting of the nozzles b1 and b2, a third nozzle group 111c consisting of the nozzles c1 and c2, a fourth nozzle group 111d consisting of the nozzles d1 and d2, and a fifth nozzle group 111e consisting of the nozzles e1 and e2.

In this embodiment, since the nozzle groups 111a–111e are configured by nozzles of the corresponding places in the blocks 112, 113, the distance between the two nozzles of each nozzle group (i.e., effective nozzle pitch) is {k·(M−1)+pb}. Interlace printing can therefore be conducted by selecting N, M, S, k and pb to make N/(M·S) and {k·(M−1)+pb} relatively prime and effecting sub-scanning at a constant pitch of N/(M·S). In the example of FIG. 24, N=10, M=5 (N/BN=10/2=5), k=4, pb=5 and S=1, so that N/(M·S)=10/5=2 and {k·(M−1)+pb}={4·(5−1)+5}=21. N/(M·S) and {k·(M−1)+pb} are therefore relatively prime. The sub-scan feed amount is 10/(5·1)=2 dots.

In the printing scheme shown in FIG. 24, the inter-group pitch is k and the distance (pitch) between the two nozzles of each nozzle group is {k·(M−1)+pb}. Although this embodiment does not satisfy the aforesaid condition C3b regarding the inter-group distance, they satisfy conditions C3a and C3c.

Figure 25:
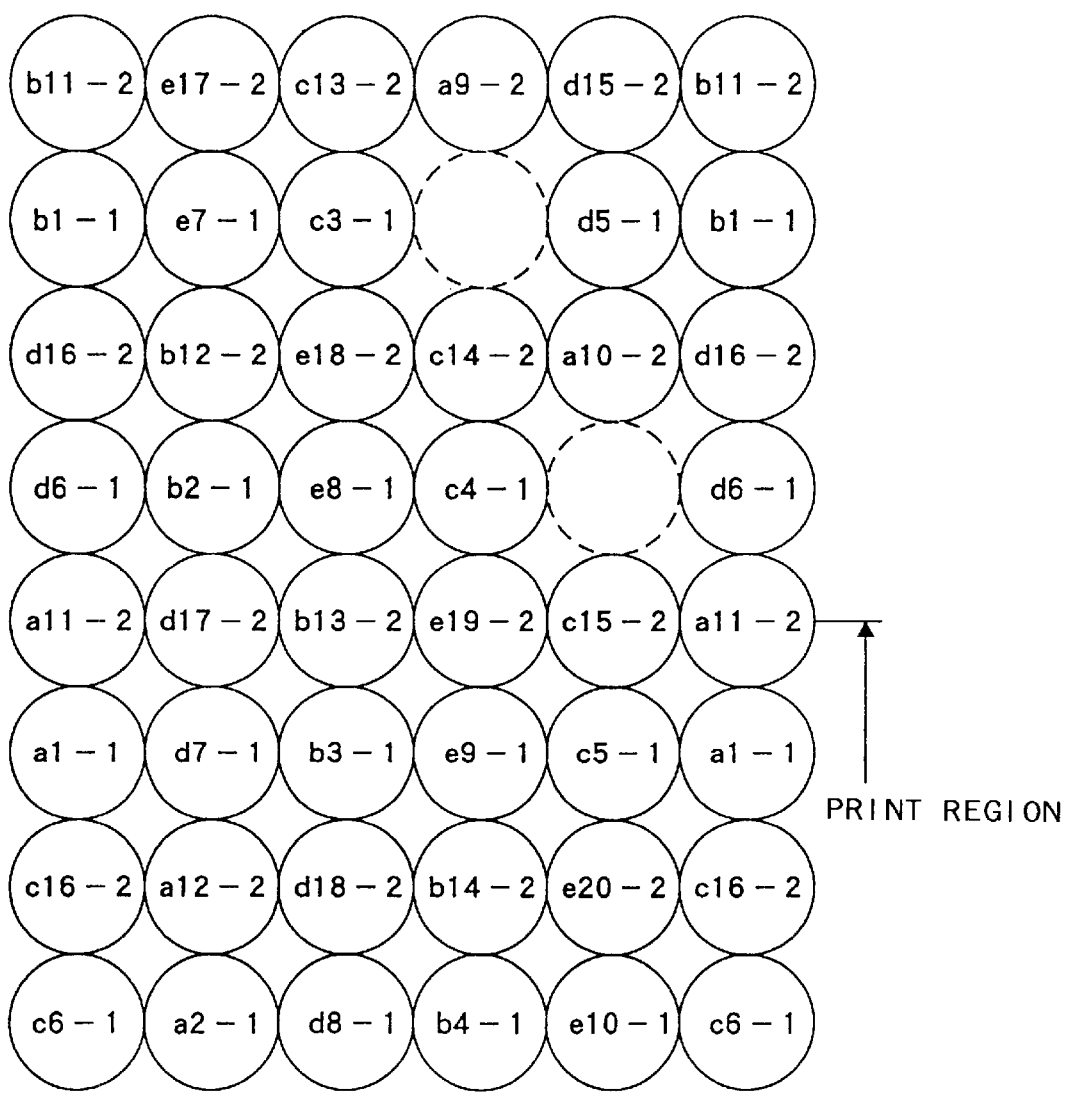
FIG. 25 is an enlarged explanatory view showing the condition of dot formation in FIG. 24.

As shown in FIG. 25, in the embodiment of the foregoing configuration, dot lines can be densely formed from where the second nozzle a2 of the first nozzle group 111a is positioned at the eleventh main scan pass.

Although the nozzles of the blocks 112, 113 are respectively represented by circles and squares in FIG. 24, the blocks 112, 113 are not differentiated in printing control. FIG. 25 does not differentiate the nozzles by which block they belong to. The symbols within the circles representing the dots in FIG. 25 indicate the nozzle group concerned, the number of main scan passes and the nozzle number. For example, "b11-2" means that the dot was formed by the second nozzle ("b") of the second nozzle group ("-2") in the "11"th main scan pass.

Like the earlier embodiments, this embodiment can also form dot lines adjacent in the sub-scanning direction with different nozzles to thereby effect high-quality printing.

The second printing scheme can also utilize the print head 51 (FIG. 15) of the fourth embodiment of the first printing scheme or the print head 61 (FIG. 16) of the fifth embodiment of the first printing scheme described earlier.

One skilled in the art will be able to make suitable changes, additions, variations, deletions and the like in respect of the embodiments of the second printing scheme described in the foregoing without departing from the scope of the present invention. For example, while embodiments were explained in which dots are formed along the main scanning direction defined as the first scanning direction, this is not limitative and it is possible instead to adopt a configuration in which printing is effected along the sub-scanning direction defined as the second scanning direction.

In the second printing scheme of the invention, since every dot forming element group scans every raster line, printing is not limited to the "overlap" pattern indicated regarding the embodiments but can also be effected in other types of overlap patterns. In this case, the first main scan forms a continuous dot line and the next main scan overlays new dots on the already formed dots, thus enabling a higher level of multigradation printing.

Although a serial printer was taken as an example in the embodiments of the second printing scheme, application to a line printer etc. or to a facsimile apparatus, a photographic apparatus or the like is also possible. Application to a multifunction printing apparatus incorporating various features, e.g., facsimile capability, is also feasible.

As is clear from the foregoing explanation, the second printing scheme according to the invention differentiates the inter-group distance an between the dot forming element groups from the element pitch k between the dot forming elements in the dot forming element groups, thereby enabling ready formation of a print head having a large number of dot forming elements. In addition, since it selects the parameters N, M, S and k to make N/(M·S) and k relatively prime and conveys the printing medium at a constant pitch that is N/(M·S) times the dot pitch D, interlace printing can be achieved even though the presence of intervening intergroup distance an causes the element pitch of the dot forming elements to differ locally within the head.

In the second printing scheme of the present invention, the intergroup distance an can be any positive integer other than the nozzle pitch k. Since interlace printing can therefore be conducted even if the inter-group distance an differs between different dot forming element groups, a print head with many dot forming elements can be easily obtained.

D. Basic Conditions of Irregular-feed Printing Scheme:

FIG. 26 is a diagram for explaining the basic conditions of a first irregular-feed printing scheme using multiple nozzle groups. By "irregular feed" is meant a sub-scanning scheme that uses a combination of feed amounts of different values. In contrast, the feed in the printing scheme illustrated in FIGS. 4 and 5 is called "constant feed" because the feed amount is fixed.

The arrangement of the M number of nozzle groups $NG_1$–$NG_M$ shown in FIG. 26 is the same as that of the constant-feed first printing scheme shown in FIG. 4. The conditions indicated at the bottom of FIG. 26 differ from the conditions of the constant-feed first printing scheme shown in FIG. 4 only in the sub-scan feed amount Lj.

In the irregular-feed printing scheme, however, the number of scans S is not limited to an integral value but can be selected as a value including a decimal fraction. When the number of scans S is an integral value, overlap printing (printing in which formation of all dots is completed in two or more main scans) is conducted on all raster lines. When the number of scans S includes a decimal fraction, it may happen that overlap printing is conducted on some raster lines and not conducted on the others. This type of printing is called "partial overlap printing." The irregular-feed printing scheme, being subject to less severe parameter restrictions than constant-feed printing, can also effect partial overlap printing.

In the first irregular-feed printing scheme shown in FIG. 26, as in the first constant-feed printing scheme, each nozzle group records different raster lines and the raster lines recorded by each nozzle group occur periodically at a pitch of M dots. Specifically, in the first irregular-feed printing scheme, the raster lines recorded by the individual nozzle groups all exhibit the same pattern of periodic arrangement at a pitch of M dots and all dots in the print region are recorded by offsetting this identical pattern little by little every nozzle group.

As was explained with reference to FIG. 3, however, in the constant-feed printing scheme using a single nozzle group, condition C1' set out again below is satisfied.

[Condition C1']:

Sub-scan feed amount L equal to effective number of nozzles N1/S, and sub-scan feed amount L (=N1/S) and nozzle pitch k relatively prime.

By satisfying condition C1', the offsets F (F=(ΣL)% k) during the k·S number of sub-scan feeds will take every value between 0 and (k−1), S times each. All dots in the print region can therefore be serviced with none being needlessly overwritten or skipped.

Although, condition C1' cannot be satisfied in the irregular-feed printing scheme, it can be seen from an analysis of condition C1' and its effect that in the irregular-feed printing scheme it suffices to set a sub-scan feed amount Lj as follows.

[Condition C4]:

Average value ave(Lj) of sub-scan feed amount Lj during k·S scans equal to effective number of nozzles N1/S, and offset (ΣLj)% k at the jth sub-scan feed during k·S scans (j is an integer between 1 and k·S) takes each value between 0 and (k−1), S times.

(ΣLj) indicates the cumulative sum of the first to jth feed amounts $L_1$ to $L_j$ and "%" is an operator indicating that the remainder of the division is taken.

Condition C4 can be applied when only a single nozzle group is used. As was explained with reference to FIG. 4, when M number of nozzle groups are used, each nozzle group is responsible for recording raster lines occurring at a pitch of M dots. It therefore suffices for the value of 1/M times the sub-scan feed amount Lj to satisfy condition C4. Further, the value relating to the nozzle pitch k of condition C4 can be considered to have become substantially 1/M. Therefore, in the first irregular-feed printing scheme, condition C4 can be rewritten as the following condition C4a.

[Condition C4a]:

Average value ave(Lj/M) of sub-scan feed amount Lj per group during k·S/M scans equal to effective number of nozzles N1/S, and value {(ΣLj/M)% (k/M)} at jth sub-scan feed during k·S/M scans (j is an integer between 1 and k·S/M) takes each value between 0 and {k/M)−1)}, S times.

(ΣLj) indicates the cumulative sum of the first to jth feed amounts $L_1$ to $L_j$ and "%" is an operator indicating that the remainder of the division is taken.

By satisfying condition C4a, each nozzle group can be made to scan each of the raster lines occurring at a pitch of M dots S times. And all dots in the print region can be serviced with none being needlessly overwritten or skipped.

The other conditions C2b and C2c of the first constant-feed printing scheme can be adopted without modification as irregular feed conditions C4b and C4c.

[Condition C4b]:

Each of (M−1) values of (Σ$pn_i$)% M takes a different value between 1 and (M−1).

[Condition C4c]:

Each of (M−1) values of (Σ$pg_i$)% M takes a different value between 1 and M−1).

Condition C4c relating to the inter-group pitch $pg_i$ is more moderate than condition C4b relating to the inter-group distance $pn_i$. This means that condition C4b need not be satisfied so long as condition C4c is satisfied.

FIG. 27 is a diagram for explaining the basic conditions of a second irregular-feed printing scheme. In the second irregular-feed printing scheme, as in the second constant-feed printing scheme shown in FIG. 5, every nozzle group records every raster line and each nozzle group is responsible for recording 1/M of all dots of each raster line. In other words, the dots serviced by each nozzle group occur at a pitch of M dots in every raster line. Since in this printing scheme every nozzle group conducts recording on every raster line, the following condition C5a holds with respect to the sub-scan feed amount Lj. Condition C5a is similar to condition C4 in the printing scheme using a single nozzle group explained earlier.

[Condition C5a]:

Average value ave(Lj) of sub-scan feed amount Lj during k·S scans equal to effective number of nozzles N1/S, and offset (ΣLj)% k at jth sub-scan feed during k·S scans (j is an integer between 1 and k·S) takes each value between 0 and (k−1), S times.

The other conditions C3b and C3c of the second constant-feed printing scheme can be adopted without modification as irregular feed conditions C5b and C5c.

[Condition C5b]:

At least one inter-group distance $pn_i$ takes a value different from nozzle pitch k.

[Condition C5c]:

At least one inter-group pitch $pg_i$ takes a value different from nozzle pitch k.

Condition C5c relating to the inter-group pitch $pg_i$ is more moderate than condition C5b relating to the inter-group distance $pn_i$. This means that condition C5b need not be satisfied so long as condition C5c is satisfied.

Although in the example of FIG. 27 each dot line in the column direction (vertical direction) is recorded by one nozzle group, it is instead possible to record each dot line in the column direction with multiple nozzle groups. The dots recorded by each nozzle group occur at a pitch of M dots in every raster line in this case, too, but the positions of the dots recorded by the nozzle group are progressively offset in the row direction every raster line. Specifically, in the second irregular-feed printing scheme the dots recorded by each nozzle group exhibit the same pattern of periodic arrangement at a pitch of M dots in each raster line and all dots in the print region are recorded by offsetting this identical pattern little by little every nozzle group.

In the first and second irregular-feed printing schemes explained above, the sub-scan feed amount Lj can be set to various values. The conditions regarding the number of nozzles used can therefore be relaxed compared with the case of constant feed. As this enables more of the installed nozzles to be used for printing, the printing speed can be increased. The irregular-feed printing scheme also enables the combination of nozzles used to record a given raster line to be changed by adjusting the feed amount arrangement. This capability can be used to mitigate the banding (occurrence of image-degrading streaks in the main scanning direction) that arises when a bad combination of nozzles is used to record a given raster line. The irregular-feed printing scheme is thus capable of printing high-quality images at high speed.

Even using the same print heads, multiple types of sub-scan feed amount arrangements can be adopted to implement irregular feed. Therefore, in the irregular-feed printing scheme, the parameters of the printing scheme can be readily set to obtain high image quality.

E. Embodiments of the Irregular-feed Printing Scheme

E-1. Embodiments of the First Irregular-feed Printing Scheme

Figure 29:
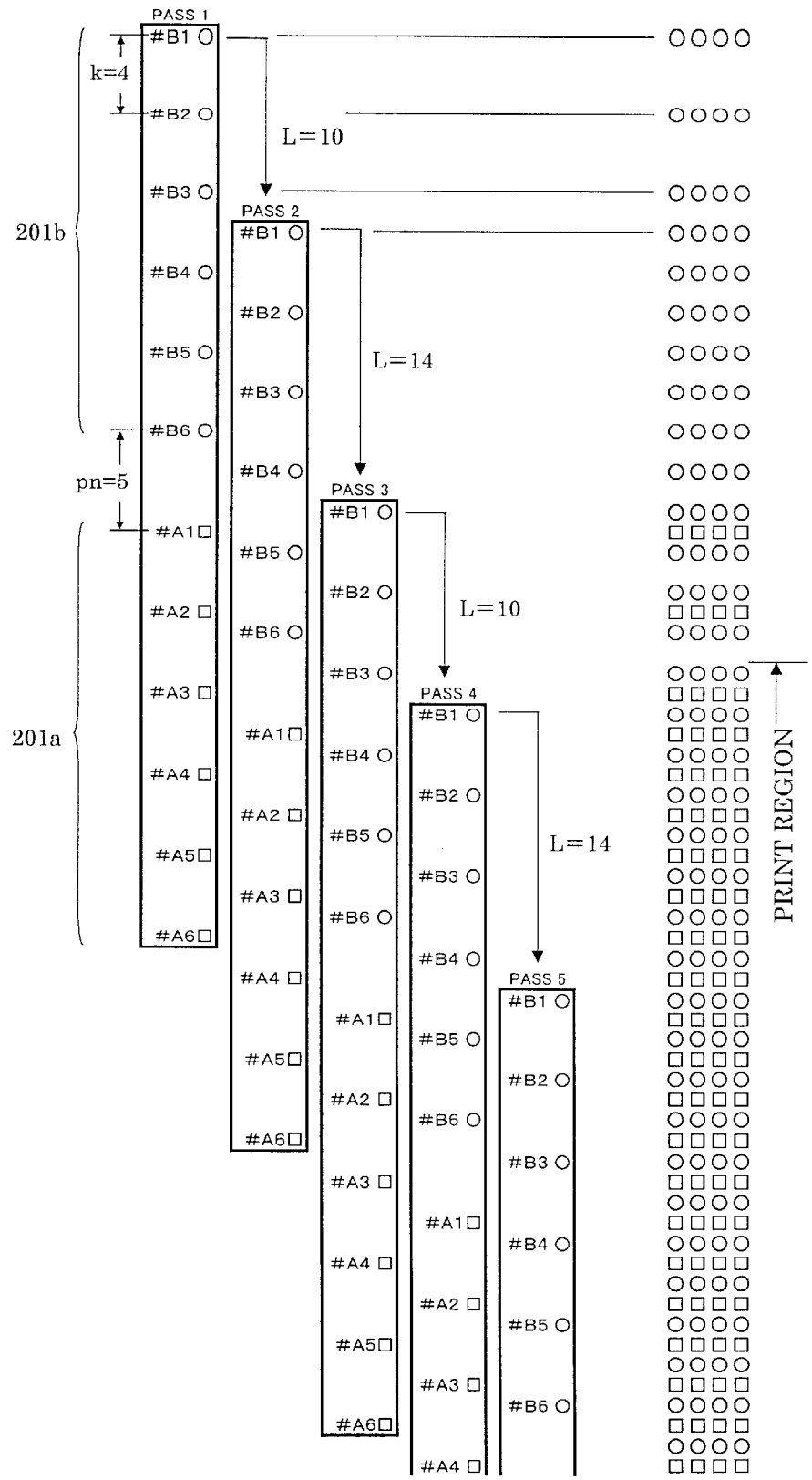
FIG. 29 is an explanatory diagram showing how the print processing is carried out in the first embodiment of the first irregular-feed printing scheme.

FIG. 28 is diagram for explaining the parameters of a first embodiment of the first irregular-feed printing scheme and FIG. 29 is an explanatory diagram showing how the print processing is carried out. In this printing scheme, the number of nozzle groups M=2, the number of nozzles per group N1=6, the total number of nozzles N=12, the nozzle pitch k=4, the number of scans S=1, and the inter-group distance pn=5. Each sub-scan feed cycle includes 2 (=k·S/M) feeds. The table in FIG. 28 further indicates the per-cycle sub-scan feed amount Lj, Lj/M (hereinafter called "per-group feed amount"), the cumulative sum $\Sigma(Li/M)$ thereof, and the offset F $(=(\Sigma Li/M)\% (k/M))$.

As shown at the bottom of FIG. 28, the average value ave (Li/M) of the per-group sub-scan feed amount Lj during each cycle is 6 and is equal to the effective number of nozzles N1/S. The offset F takes each value between 0 and 1 one time during each cycle. The printing scheme of FIG. 28 therefore satisfies condition C4a set out above and the inter-group distance an satisfies condition C4b.

As shown in FIG. 29, each of the two nozzle groups 201a and 201b services one of every two raster lines in the print region. As a result, all raster lines in the print region can be recorded with none skipped or needlessly overwritten.

Figure 31:
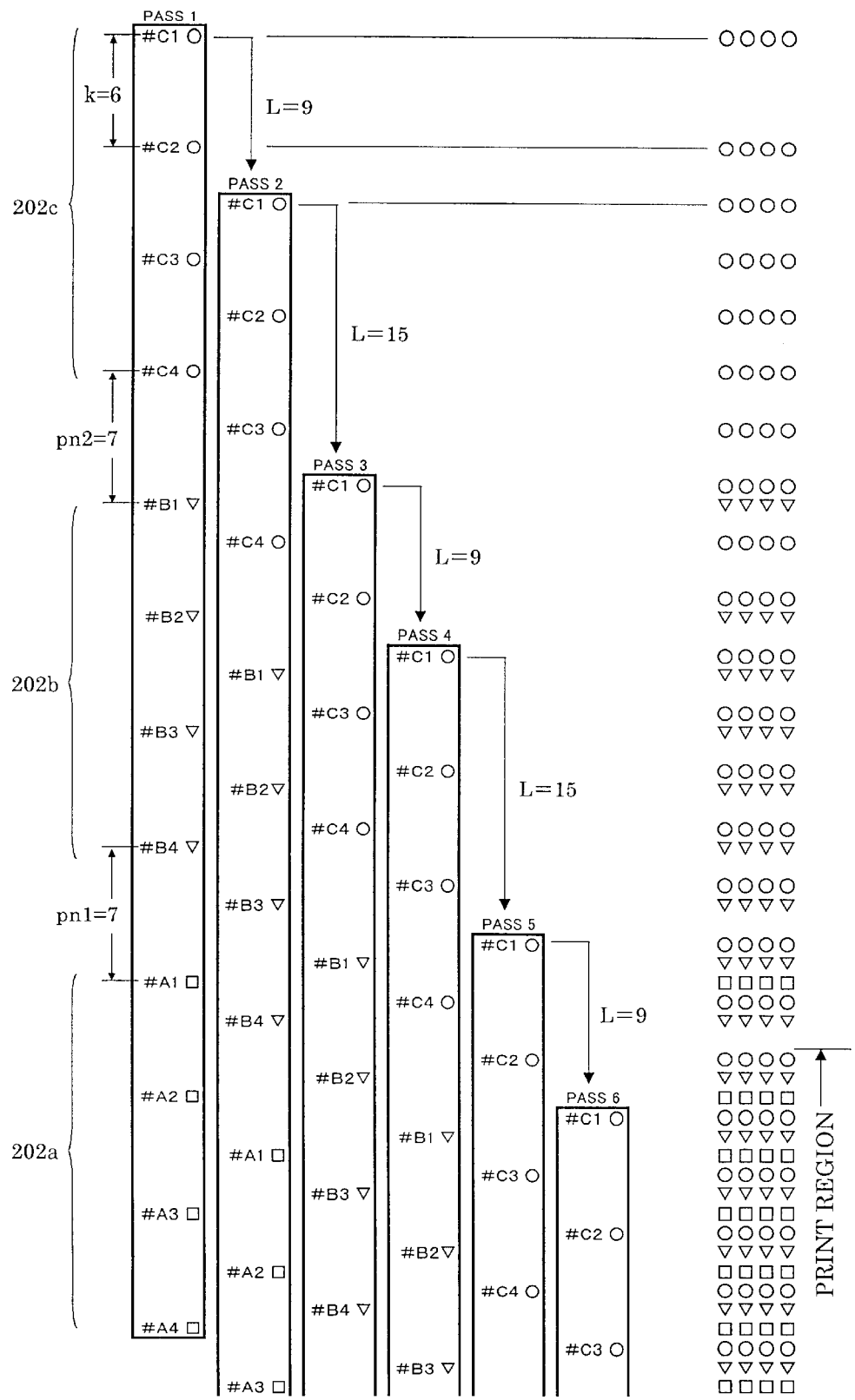
FIG. 31 is an explanatory diagram showing how the print processing is carried out in the second embodiment of the first irregular-feed printing scheme.

FIG. 30 is diagram for explaining the parameters of a second embodiment of the first irregular-feed printing scheme and FIG. 31 is an explanatory diagram showing how the print processing is carried out. In this printing scheme, the number of nozzle groups M=3, the number of nozzles per group N1=4, the total number of nozzles N=12, the nozzle pitch k=6, the number of scans S=1, and the inter-group distance pn1=pn2=7. Each sub-scan feed cycle includes 2 (=k·(S/M feeds.

As shown at the bottom of FIG. 30, the average value ave(Lj/M of the per-group feed amount Lj/M during each cycle is 4 and is equal to the effective number of nozzles N1/S. As shown in the table in FIG. 30, the offset F takes each value between 0 and 1 one time during each cycle. The printing scheme of FIG. 30 therefore satisfies condition C4a set out above and he inter-group distance an satisfies condition C4b.

As shown in FIG. 31, each of the three nozzle groups 202a–202c services one of every three raster lines in the print region. As a result, all raster lines in the print region can be recorded with none skipped or needlessly overwritten.

Figure 33:
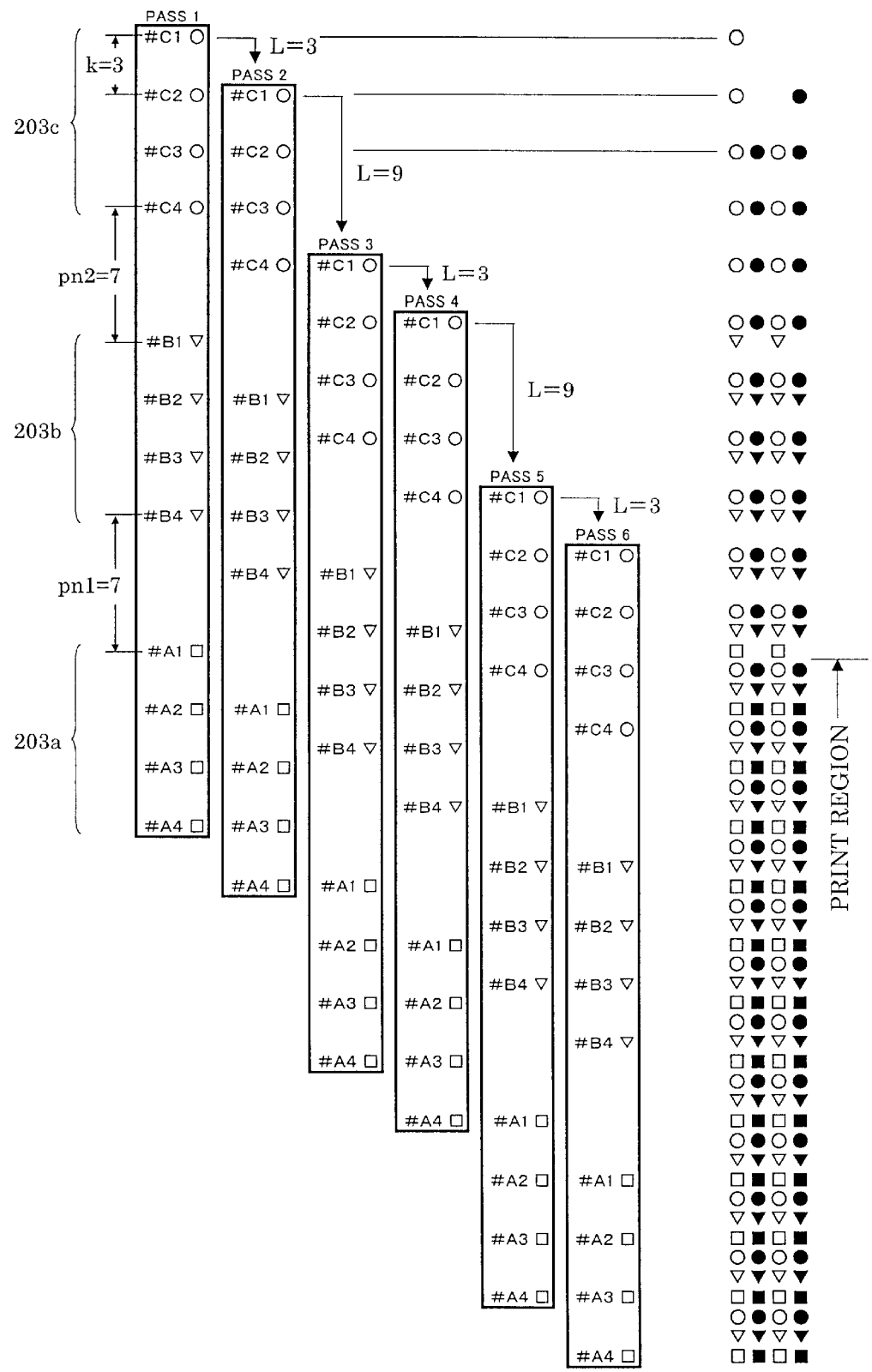
FIG. 33 is an explanatory diagram showing how the print processing is carried out in the third embodiment of the first irregular-feed printing scheme.

FIG. 32 is diagram for explaining the parameters of a third embodiment of the first irregular-feed printing scheme and FIG. 33 is an explanatory diagram showing how the print processing is carried out. In this printing scheme, the number of nozzle groups M=3, the number of nozzles per group N1=4, the total number of nozzles N=12, the nozzle pitch k=3, the number of scans S=2, and the inter-group distance pn1=pn2=7. Each sub-scan feed cycle includes 2 (=k·S/M) feeds.

As shown at the bottom of FIG. 32, the average value ave (Lj/M) of the per-group feed amount Lj/M during each cycle is 2 and is equal to the effective number of nozzles N1/S. As shown in the table in FIG. 32, the offset F takes the value 0 two times during each cycle. The printing scheme of FIG. 32 therefore satisfies condition C4a set out above and the inter-group distance an satisfies condition C4b.

As shown in FIG. 33, each of the three nozzle groups 203a–203c services one of every three raster lines in the print region. Each raster line is recorded using two different nozzles.

A blank square indicates a dot serviced during the first scan of the raster line by the first nozzle group 203a and a solid square indicates a dot serviced during the second scan of the same raster line by the first nozzle group 203a. A solid triangle indicates a dot serviced during the second scan of the raster line by the second nozzle group 203b and a solid circle indicates a dot serviced during the second scan of the raster line by the third nozzle group 203c. The dot positions serviced during the first scan and the dot positions serviced during the second scan can be interchanged.

E-2. Embodiments of the Second Irregular-feed Printing Scheme

Figure 35:
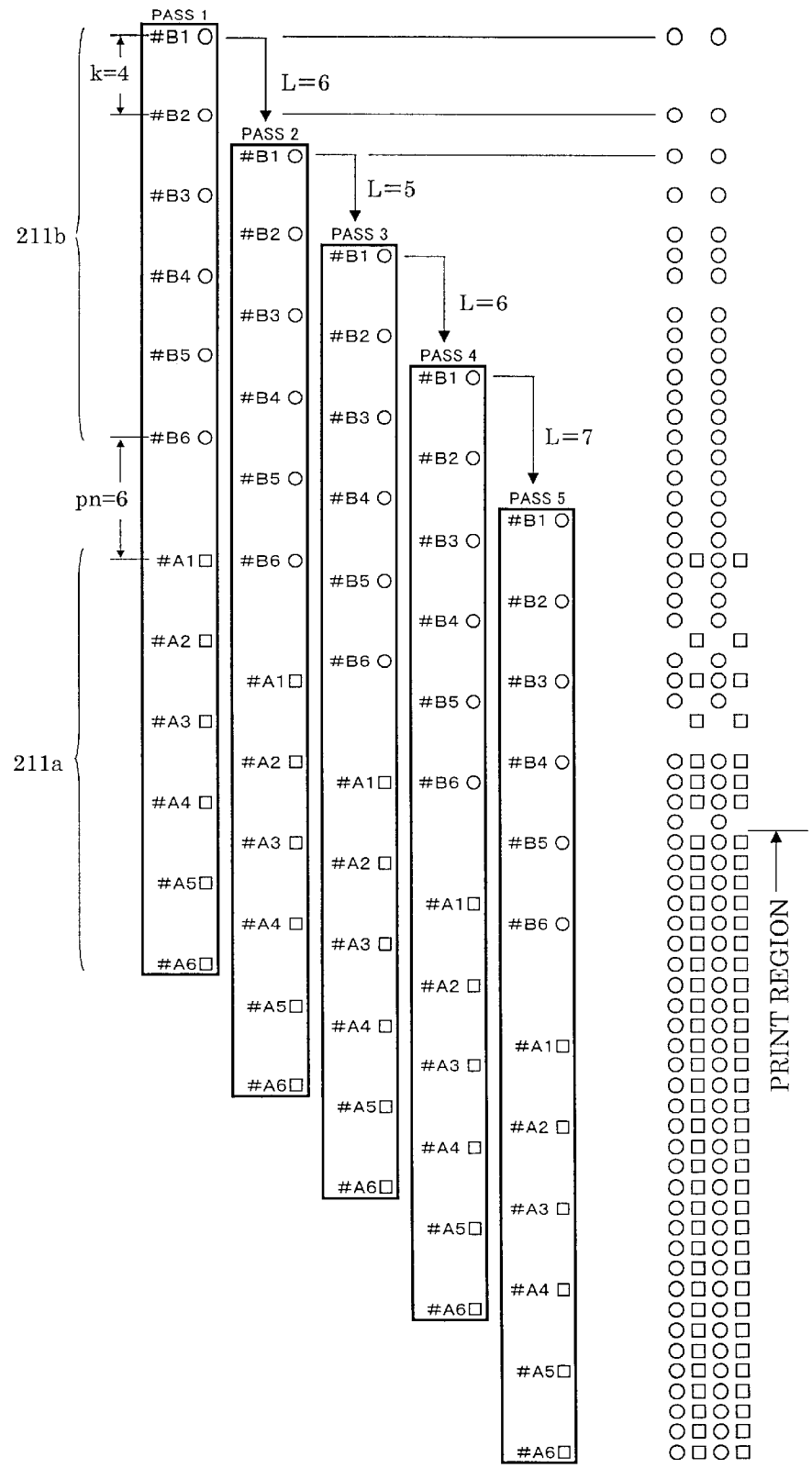
FIG. 35 is an explanatory diagram showing how the print processing is carried out in the first embodiment of the second irregular-feed printing scheme.

FIG. 34 is a diagram for explaining the parameters of a first embodiment of the second irregular-feed printing scheme and FIG. 35 is an explanatory diagram showing how the print processing is carried out. In this printing scheme, the number of nozzle groups M=2, the number of nozzles per group N1=6, the total number of nozzles N=12, the nozzle pitch k=4, the number of scans S=1, and the inter-group distance pn=6. Each sub-scan feed cycle includes 4 (=k·S) feeds. The table in FIG. 34 indicates the per-cycle sub-scan feed amount Lj, the cumulative sum $\Sigma Li/M$ thereof, and the offset F $(=(\Sigma Li)\% k)$.

As shown at the bottom of FIG. 34, the average value ave(Li) of the feed amount during each cycle is 6 and is equal to the effective number of nozzles N1/S. The offset F takes each value between 0 and 3 one time during each cycle. The printing scheme of FIG. 34 therefore satisfies condition C5a set out above and the inter-group distance an satisfies condition C5b.

As shown in FIG. 35, each of the two nozzle groups 211a and 211b services all raster lines in the print region. The first and second nozzle groups 211a and 211b service alternate dots of each raster line.

Figure 37:
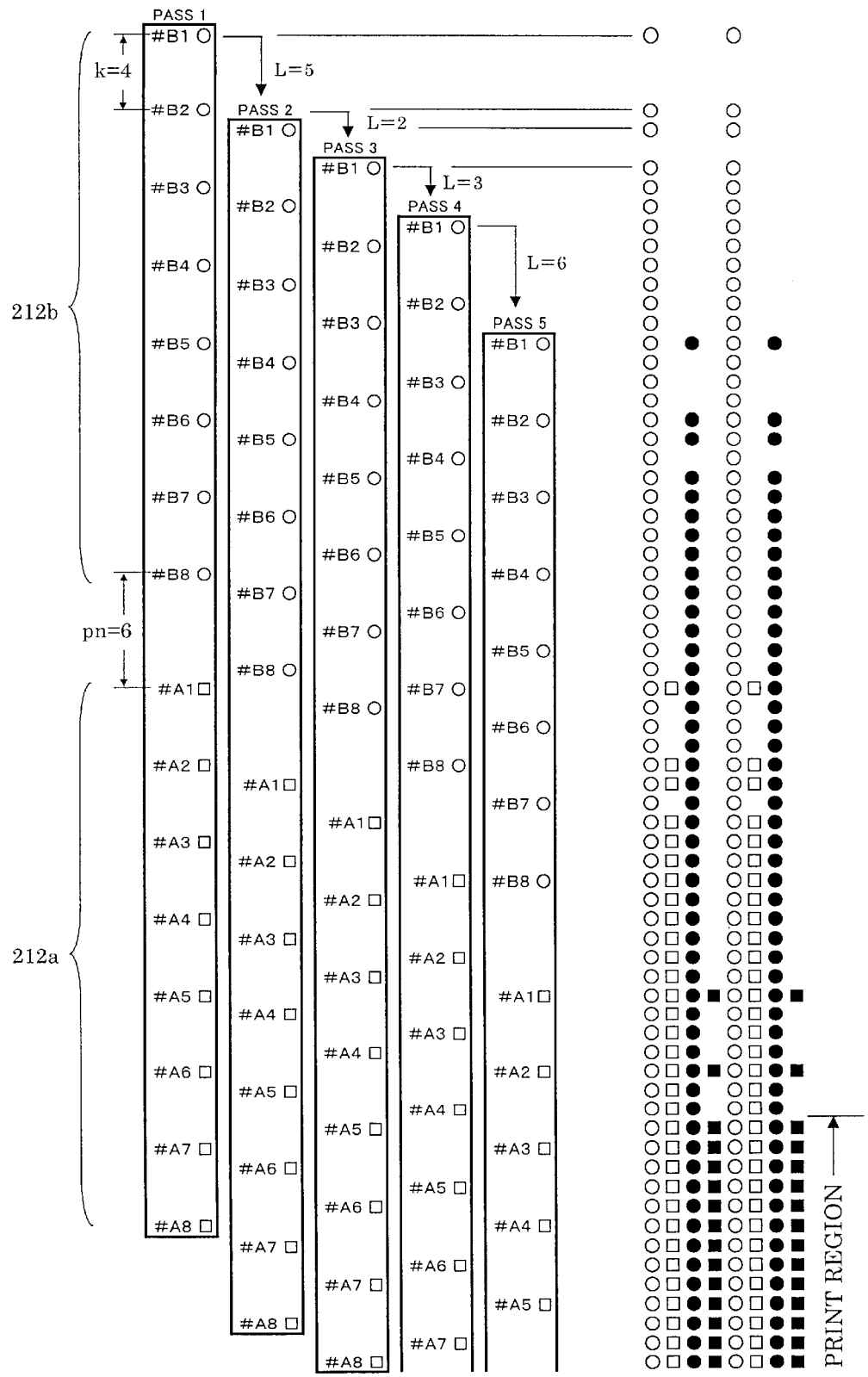
FIG. 37 is an explanatory diagram showing how the print processing is carried out in the second embodiment of the second irregular-feed printing scheme.

FIG. 36 is diagram for explaining the parameters of a second embodiment of the second irregular-feed printing scheme and FIG. 37 is an explanatory diagram showing how the print processing is carried out. In this printing scheme, the number of nozzle groups M=2, the number of nozzles per group N1=8, the total number of nozzles N=16, the nozzle pitch k=4, the number of scans S=2, and the inter-group distance pn=6. Each sub-scan feed cycle includes 8 (=k·S) feeds.

As shown at the bottom of FIG. 36, the average value ave(Li) of the feed amount during each cycle is 4 and is equal to the effective number of nozzles N1/S. As shown in the table in FIG. 36, the offset F takes each value between 0 and 3 two times during each cycle. The printing scheme of FIG. 36 therefore satisfies condition C5a set out above and the inter-group distance an satisfies condition C5b.

As shown in FIG. 37, each of the two nozzle groups 212a and 212b services all raster lines in the print region. The first and second nozzle groups 212a and 212b service alternate dots of each raster line. A solid square indicates a dot serviced during the second scan of the raster line by the first nozzle group 212a. A solid circle indicates a dot serviced during the second scan of the raster line by the second nozzle group 212b. Servicing of the dots on a raster line is thus completed in four scans.

In the second irregular-feed printing scheme, the main scan speed management Table 8 (FIG. 6) dynamically controls the main scan speed VS, or the "first scan direction speed", in accordance with the number of raster line scans M·S. Specifically, the main scan speed VS, i.e., the speed of print head 71, is stored in the main scan speed management Table 8 in association with different print modes with different numbers of scans M·S. The main scan speed VS1 when the number of group scans S is 1, i.e., when every dot line in the main scanning direction is formed by a single nozzle group in a single scan, is defined as a reference speed and the main scan speed VS increases with the multiplying factor of the number of group scans S. Specifically, the main scan speed VS2 when S=2 is set to double the reference speed VS1 and the main scan speed VS3 when S=3 is set to treble the reference speed VS1. The invention is not limited to this, however, and, for example, it is possible to set the main scan speed VS2 when S=2 to 1.5 times the reference scan speed VS1. Although the main scan speed is preferably increased in proportion as the number of nozzle groups M increases, it is not dependent on the number of nozzle groups M and can be varied in proportion to only the number of group scans S.

As the first and second irregular-feed printing schemes described in the foregoing employ multiple nozzle groups, a print head equipped with many nozzles can be readily utilized. Moreover, restrictions on the sub-scan feed amount and the number of nozzles used is less severe than in the case of constant feed because the sub-scan feed amounts need not be set to a fixed value but can be set to a combination of different values. Many nozzles can therefore be used to achieve higher printing speeds. In addition, the combination of nozzles used to record a given raster line can be changed. This capability can be used to decrease banding (occurrence of image-degrading streaks in the main scanning direction) and thus to enhance image quality.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing apparatus that effects printing by forming dots in a print region on a printing medium, comprising:

a print head;

a first scan driver which moves at least one of the print head and the printing medium in a first scanning direction;

a second scan driver which moves at least one of the print head and the printing medium in a second scanning direction perpendicular to the first scanning direction; and a print head driver which drives the print head to form dots on the printing medium responsive to print image data;

wherein the print head includes N number (N being an integer not smaller than 4) of dot forming elements, a minimum element pitch in the second scanning direction between a neighboring pair of the dot forming elements being k·D (k being an integer; D being a dot pitch corresponding to printing resolution) in the print head, the N number of dot forming elements being classified into M number of dot forming element groups each including N/M number of dot forming elements (M and N/M being integers not smaller than 2), an ith (i being an integer between 1 and (M−1)) dot forming element group and an (i+1)th dot forming element group among the M number of dot forming element groups being offset in the second scanning direction by an inter-group pitch $pg_i \cdot D$ ($pg_i$ being an integer different from k); and the first and second scan drivers and the print head driver driving the print head and the printing medium so that the M number of dot forming element groups have identical patterns of dot-formable positions and the identical patterns of the M number of dot forming element groups are shifted from each other to make all dot positions in the print region to be dot-formable.

2. A printing apparatus according to claim 1, wherein:

the second scan driver conveys at least one of the print head and the printing medium in the second scanning direction using a combination of different feed amounts.

3. A printing apparatus according to claim 2, wherein each neighboring pair of the dot forming element groups are spaced apart by an interval in the second scanning direction, and the N/M number of dot forming elements of each dot forming element group are capable of forming N/M number of identical dots aligned substantially in a single row in the second scanning direction at the minimum element pitch k·D.

4. A printing apparatus according to claim 3, wherein:

the identical patterns of the M number of dot forming element groups are composed of multiple first scanning direction dot lines occurring periodically at a pitch of M dots.

5. A printing apparatus according to claim 4, wherein:

each first scanning direction dot line is formed by S number of scans in the first scanning direction where S is a positive integer; and the feed amount Lj·D in the second scanning direction where j is an integer between 1 and k·S/M is set such that an average value of Lj/M during (k·S)/M feeds is equal to N/(M·S) and that a remainder of dividing (ΣLj/M) by k/M takes each value between 0 and {(k/M)−1}, S times, where (ΣLj/M) denotes a cumulative sum of L1/M through Lj/M.

6. A printing apparatus according to claim 5, wherein:

the ith and (i+1)th dot forming element groups are separated by an inter-group distance $pn_i \cdot D$ ($pn_i$ being an integer) and $An_i$ is set so that each of (M−1) number of remainders of dividing an accumulated value ($\Sigma pn_i$) of the values $pn_1$ to $pn_i$ by M takes a different value between 1 and (M−1).

7. A printing apparatus according to claim 6, wherein:

the print head is formed by arraying M number of dot forming element units separated in the second scanning direction by the inter-group distance $pn_i \cdot D$, each dot forming element unit having the N/M number of dot forming elements whose pitch in the second scanning direction is equal to the minimum element pitch k·D.

8. A printing apparatus according to claim 7, wherein:

each dot forming element unit has a row of even-numbered dot forming elements and a row of odd-numbered dot forming elements each having multiple dot forming elements aligned in the second scanning direction at an element pitch 2k·D which is twice the minimum element pitch k·D, the row of even-numbered dot forming elements and the row of odd-numbered dot forming elements being spaced from each other in the first scanning direction.

9. A printing apparatus according to claim 6, wherein:

the first scan driver drives the at least one of the print head and the printing medium in the first scanning direction at a first scanning direction speed that is a function of the number of scans S.

10. A printing apparatus according to claim 3, wherein:

the identical patterns of the M number of dot forming element groups are composed of multiple dots occurring periodically at a pitch of M dots on every first scanning direction dot line.

11. A printing apparatus according to claim 10, wherein:
each first scanning direction dot line is formed by S number of scans in the first scanning direction where S is a positive integer; and
the feed amount $Lj \cdot D$ in the second scanning direction where j is an integer between 1 and $k \cdot S$ is set such that an average value of Lj during $k \cdot S$ feeds is equal to $N/(M \cdot S)$ and that a remainder of dividing $(\Sigma Lj)$ by k takes each value between 0 and $(k-1)$, S tines, where $(\Sigma Lj)$ denotes a cumulative sum of L1 through Lj.

12. A printing apparatus according to claim 11, wherein:
the ith and (i+1)th dot forming element groups are separated by an inter-group distance $pn_i \cdot D$ where $pn_i$ is an integer, at least one of $pn_i$ being different from k.

13. A printing apparatus according to claim 12, wherein:
the print head is formed by arraying M number of dot forming element units separated in the second scanning direction by the inter-group distance $pn_i \cdot D$, each dot forming element unit having the N/M number of dot forming elements whose pitch in the second scanning direction is equal to the minimum element pitch $k \cdot D$.

14. A printing apparatus according to claim 13, wherein:
each dot forming element unit has a row of even-numbered dot forming elements and a row of odd-numbered dot forming elements each having multiple dot forming elements aligned in the second scanning direction at an element pitch $2k \cdot D$ which is twice the minimum element pitch $k \cdot D$, the row of even-numbered dot forming elements and the row of odd-numbered dot forming elements being spaced from each other in the first scanning direction.

15. A printing apparatus according to claim 12, wherein:
the M number of dot forming element groups are formed by inactivating at least one dot forming element in the print head among the multiple dot forming elements arrayed in the second scanning direction at the minimum element pitch $k \cdot D$.

16. A printing apparatus according to claim 12, wherein:
the first scan driver drives the at least one of the print head and the printing medium in the first scanning direction at a first scanning direction speed that is a function of the number of scans $M \cdot S$.

17. A printing apparatus according to claim 2, wherein:
the N number of dot forming elements are separated into BN number of blocks (BN being equal to N/M) each including M number of dot forming elements, a neighboring pair of the BN number of blocks being separated by an inter-block distance $pb \cdot D$ (pb being a positive integer unequal to k), the M number of dot forming element groups being composed of corresponding dot forming elements in the blocks; and
the M number of dot forming elements of each block are capable of forming M number of identical dots aligned substantially in a single row in the second scanning direction at the minimum element pitch $k \cdot D$.

18. A printing apparatus according to claim 17, wherein:
the print head is formed by arraying BN number of dot forming element units separated in the second scanning direction by the inter-block distance $pb \cdot D$, each dot forming element unit having the M number of dot forming elements whose pitch in the second scanning direction is equal to the minimum element pitch $k \cdot D$.

19. A printing apparatus according to claim 18, wherein:
each dot forming element unit has a row of even-numbered dot forming elements and a row of odd-numbered dot forming elements each having multiple dot forming elements aligned in the second scanning direction at an element pitch $2k \cdot D$ which is twice the minimum element pitch $k \cdot D$, the row of even-numbered dot forming elements and the row of odd-numbered dot forming elements being spaced from each other in the first scanning direction.

20. A printing apparatus according to claim 17, wherein:
the BN number of blocks are formed by inactivating at least one dot forming element in the print head among the multiple dot forming elements arrayed in the second scanning direction at the minimum element pitch $k \cdot D$.

21. A printing apparatus according to claim 17, wherein:
the first scan driver drives the at least one of the print head and the printing medium in the first scanning direction at a first scanning direction speed that is a function of the number of scans $M \cdot S$.

22. A printing apparatus according to claim 1, wherein
the second scan driver conveys at least one of the print head and the printing medium at a constant feed amount that is at least twice the dot pitch D.

23. In a printing apparatus for forming dots on a printing medium responsive to print image data while moving at least one of a print head and the printing medium in a first scanning direction and moving at least one of a print head and the printing medium in a second scanning direction perpendicular to the first scanning direction, a printing method that effects printing by forming dots in the print region on the printing medium, comprising the steps of:
providing a print head including N number (N being an integer not smaller than 4) of dot forming elements, a minimum element pitch in the second scanning direction between a neighboring pair of the dot forming elements being $k \cdot D$ (k being an integer; D being a dot pitch corresponding to printing resolution) in the print head, the N number of dot forming elements being classified into M number of dot forming element groups each including N/M number of dot forming elements (M and N/M being integers not smaller than 2), an ith (i being an integer between 1 and (M−1)) dot forming element group and an (i+1)th dot forming element group among the M number of dot forming element groups being offset in the second scanning direction by an inter-group pitch $pg_i \cdot D$ ($pg_i$ being an integer different from k);
conveying at least one of the print head and the printing medium in the second scanning direction; and
driving the print head and the printing medium so that the M number of dot forming element groups have identical patterns of dot-formable positions and the identical patterns of the M number of dot forming element groups are shifted from each other to make all dot positions in the print region to be dot-formable.

24. A printing method according to claim 23, wherein:
the conveyance of at least one of the print head and the printing medium in the second scanning direction is performed using a combination of different feed amounts.

25. A printing method according to claim 24, wherein
each neighboring pair of the dot forming element groups are spaced apart by a dot-forming-element-free interval in the second scanning direction, and
the N/M number of dot forming elements of each dot forming element group are capable of forming N/M number of identical dots aligned substantially in a single row in the second scanning direction at the minimum element pitch $k \cdot D$.

26. A printing method according to claim 25, wherein:

the identical patterns of the M number of dot forming element groups are composed of multiple first scanning direction dot lines occurring periodically at a pitch of M dots.

27. A printing method according to claim 26, wherein:

each first scanning direction dot line is formed by S number of scans in the first scanning direction where S is a positive integer; and the feed amount $Lj \cdot D$ in the second scanning direction where j is an integer between 1 and $k \cdot S/M$ is set such that an average value of $Lj/M$ during $(k \cdot S)/M$ feeds is equal to $N/(M \cdot S)$ and that a remainder of dividing $(\Sigma Lj/M)$ by $k/M$ takes each value between 0 and $\{(k/M)-1\}$, S times, where $(\Sigma Lj/M)$ denotes a cumulative sum of $L1/M$ through $Lj/M$.

28. A printing method according to claim 27, wherein:

the ith and (i+1)th dot forming element groups are separated by an inter-group distance $pn_i \cdot D$ ($pn_i$ being an integer) and $pn_i$ is set so that each of (M−1) number of remainders of dividing an accumulated value ($\Sigma pn_i$) of the values $pn_1$ to $pn_i$ by M takes a different value between 1 and (M−1).

29. A printing method according to claim 28, wherein:

the at least one of the print head and the printing medium is conveyed in the first scanning direction at a first scanning direction speed that is a function of the number of scans S.

30. A printing method according to claim 25, wherein:

the identical patterns of the M number of dot forming element groups are composed of multiple dots occurring periodically at a pitch of M dots on every first scanning direction dot line.

31. A printing method according to claim 30, wherein:

each first scanning direction dot line is formed by S number of scans in the first scanning direction where S is a positive integer; and the feed amount $Lj \cdot D$ in the second scanning direction where j is an integer between 1 and $k \cdot S$ is set such that an average value of Lj during $k \cdot S$ feeds is equal to $N/(M \cdot S)$ and that a remainder of dividing ($\Sigma Lj$) by k takes each value between 0 and (k−1), S times, where ($\Sigma Lj$) denotes a cumulative sum of L1 through Lj.

32. A printing method according to claim 31, wherein:

the ith and (i+1)th dot forming element groups are separated by an inter-group distance $pn_i \cdot D$ where $pn_i$ is an integer, at least one of $pn_i$ being different from k.

33. A printing method according to claim 32, wherein:

the at least one of the print head and the printing medium is driven in the first scanning direction at a first scanning direction speed that is a function of the number of scans $M \cdot S$.

34. A printing method according to claim 24, wherein:

the N number of dot forming elements are separated into BN number of blocks (BN being equal to N/M) each including M number of dot forming elements, a neighboring pair of the BN number of blocks being separated by an inter-block distance $pb \cdot D$ (pb being a positive integer unequal to k), the M number of dot forming element groups being composed of corresponding dot forming elements in the blocks; and the M number of dot forming elements of each block are capable of forming M number of identical dots aligned substantially in a single row in the second scanning direction at the minimum element pitch $k \cdot D$.

35. A printing method according to claim 34, wherein:

the at least one of the print head and the printing medium is driven in the first scanning direction at a first scanning direction speed that is a function of the number of scans $M \cdot S$.

36. A printing method according to claim 23, wherein the conveyance of at least one of the print head and the printing medium in the second scanning direction is performed at a constant feed amount that is at least twice the dot pitch D.

37. A computer program product for causing a computer to produce print data to be supplied to a printing apparatus for forming dots on a printing medium responsive to the print data while moving at least one of a print head and the printing medium in a first scanning direction and moving at least one of a print head and the printing medium in a second scanning direction perpendicular to the first scanning direction, the print head including N number (N being an integer not smaller than 4) of dot forming elements, a minimum element pitch in the second scanning direction between a neighboring pair of the dot forming elements being $k \cdot D$ (k being an integer; D being a dot pitch corresponding to printing resolution) in the print head, the N number of dot forming elements being classified into M number of dot forming element groups each including N/M number of dot forming elements (M and N/M being integers not smaller than 2), an ith (i being an integer between 1 and (M−1)) dot forming element group and an (i+1)th dot forming element group among the M number of dot forming element groups being offset in the second scanning direction by an inter-group pitch $pg_i \cdot D$ ($pg_i$ being an integer different from k), the computer program product comprising:

a computer readable medium; and a computer program stored on the computer readable medium, comprising:

a program for causing the computer to produce the print data for driving the print head and the printing medium so that the M number of dot forming element groups have identical patterns of dot-formable positions and the identical patterns of the M number of dot forming element groups are shifted from each other to make all dot positions in the print region to be dot-formable.

38. A computer program product according to claim 37, wherein:

the print data include second-scanning feed data representing conveyance of at least one of the print head and the printing medium in the second scanning direction using a combination of different feed amounts.

39. A computer program product according to claim 37, wherein:

the print data includes second-scanning feed data representing conveyance of at least one of the print head and the printing medium in the second scanning direction at a constant feed amount that is at least twice the dot pitch D.

* * * * *